(12) United States Patent  (10) Patent No.: US 7,470,097 B2
Kuntz et al.  (45) Date of Patent: Dec. 30, 2008

(54) HAY BALE DISTRIBUTION CHUTE WITH REORIENTING DURING TRAILER TRAVEL OVER THE GROUND

(76) Inventors: Steven Kuntz, 8603 Hofferber Rd., Shepherd, MT (US) 59079; Mark Kuntz, 8603 Hofferber Rd., Shepherd, MT (US) 59079

( * ) Notice: Subject to any disclaimer, the term of this patent is extended or adjusted under 35 U.S.C. 154(b) by 283 days.

(21) Appl. No.: 11/420,969

(22) Filed: May 30, 2006

(65) Prior Publication Data

US 2007/0280806 A1  Dec. 6, 2007

(51) Int. Cl.
*A01D 75/04* (2006.01)
*A01D 75/00* (2006.01)
*A01D 85/00* (2006.01)
*B65G 47/24* (2006.01)

(52) U.S. Cl. .................... 414/25; 56/473.5; 56/474; 193/6; 193/48; 414/754; 414/111

(58) Field of Classification Search ........ 56/473.5–480, 56/449, 461, 341; 100/191, 87, 88, 188 BT, 100/188 R; 193/4–6, 41, 44–48, 2 A, 3 R, 193/22; 414/111, 25; 198/403, 522
See application file for complete search history.

(56) References Cited

U.S. PATENT DOCUMENTS

| | | | |
|---|---|---|---|
| 2,649,945 A * | 8/1953 | McClellan | 193/5 |
| 2,759,323 A * | 8/1956 | Nolt | 56/473.5 |
| 2,799,129 A * | 7/1957 | Huntley et al. | 56/473.5 |
| 2,853,171 A * | 9/1958 | Matthews | 193/46 |
| 2,947,400 A * | 8/1960 | Murray et al. | 193/5 |
| 3,161,008 A | 12/1964 | Shepley et al. | |
| 3,243,028 A | 3/1966 | Tufts | |
| 3,820,453 A | 6/1974 | Tipton | |
| 4,179,017 A | 12/1979 | Tilley | |
| 4,187,941 A | 2/1980 | Martin | |
| 4,408,942 A * | 10/1983 | Butler et al. | 414/24.5 |
| 4,854,809 A * | 8/1989 | Rhodes | 414/685 |
| 5,024,152 A * | 6/1991 | Girard | 100/188 R |
| 5,560,191 A * | 10/1996 | Finney et al. | 56/474 |
| 5,742,010 A | 4/1998 | Griffin | |
| 6,033,172 A | 3/2000 | Simon | |
| 6,425,235 B1 * | 7/2002 | Spaniol et al. | 56/474 |
| 6,435,801 B2 * | 8/2002 | Talbott | 414/462 |

* cited by examiner

*Primary Examiner*—Gregory W Adams
(74) *Attorney, Agent, or Firm*—Antoinette M. Tease

(57) ABSTRACT

The present invention is a bale flipping device, comprising a first vertical bar, a second vertical bar, a third vertical bar, a fourth vertical bar, a first pivot arm, a second pivot arm, and a third pivot arm, wherein the first pivot arm connects the first vertical bar to the third vertical bar, wherein the second pivot arm connects the second vertical bar to the fourth vertical bar, and wherein the third pivot arm is parallel to the second pivot arm and also connects the second vertical bar to the fourth vertical bar. The pivot arms are pivotally connected to the vertical bars so that the entire device can be folded up when not in use. The device is designed to be installed on the side of a New Holland small bale stacker.

15 Claims, 21 Drawing Sheets

HAY BALE DISTRIBUTION CHUTE WITH REORIENTING DURING TRAILER TRAVEL OVER THE GROUND

BACKGROUND OF THE INVENTION

1. Field of the Invention

The present invention relates generally to the field of agricultural equipment, and more specifically, to a device that can be used with a New Holland small bale stacking machine to flip bales in the field.

2. Description of the Related Art

Hay bales may become exposed to moisture for a variety of reasons. The premium moisture content of hay ready for baling is commonly agreed to be between fourteen (14) and eighteen (18) percent but often the bay is baled at a slightly higher moisture content, the bales may be rained on before being stacked, the unbaled hay may have a slightly higher amount of dusk/dawn dew than desired at the time of baling, or the soil may have a higher surface moisture content than desired. High moisture content in bales can lead to a greater propensity for mold or spoiling of bales.

The present invention is designed to eliminate the problems associated with high moisture content in the bales by ensuring that the bales dry more quickly and evenly. By flipping the bales, the bales are more evenly exposed to direct contact with sunlight and/or wind, both of which expedite the drying process. Furthermore, flipping the bale causes the side of the bale that was in contact with the ground to be exposed to sunlight, which aids in dissipating any surface soil moisture that was absorbed into the bale surface that was in contact with the ground at the time of discharge from the baler.

The present invention helps eliminate the problems associated with high moisture content in bales by automating the process of flipping the bales in the field. Currently, the only way to flip the bales is for workers to manually lift and flip the bales, which takes a significant amount of time and labor.

The present invention is intended to be used with a New Holland small bale stacker. There is currently no apparatus on the market that can be installed on a New Holland small bale stacking machine that allows bales to be flipped prior to being stacked. Having the ability to reposition bales quickly and easily, as afforded by the present invention, can aid tremendously in the haying process. Once the bales have dried, they can be stacked by simply reinserting the top portion of the trip lever on the stacker and folding up the bale flipping device.

Accordingly, it is an object of the present invention to provide a bale flipping device that can be used with a New Holland small bale stacker and that automates the process of flipping bales in the field to aid in the drying process. It is a further object of the present invention to provide a device that is quick to install and easy to use. It is a further object of the present invention to provide a device that can be folded up when not in use. It is a farther object of the present invention to provide a device that occupies a small profile when in the folded up position on the stacker. It is a further object of the present invention to provide a device that can be quickly and easily removed. It is a further object of the present invention to provide a device that can be used with different models of the New Holland small bale stacker.

There are a number of patented devices that turn and/or flip bales, but these devices all relate to balers and not to stacking machines. Examples includes U.S. Pat. No. 5,024,152 (Girard, 1991); U.S. Pat. No. 3,820,453 (Tipton, 1974); U.S. Pat. No. 3,243,028 (Tufts, 1966); U.S. Pat. No. 4,187,941 (Martin, 1980); U.S. Pat. No. 5,742,010 (Griffin, 1998); U.S. Pat. No. 3,161,008 (Shepley et al., 1964); U.S. Pat. No. 4,179,017 (Tilley, 1979); U.S. Pat. No. 5,560,191 (Finney et al, 1996); and U.S. Pat. No. 6,033,172 (Simon, 2000). The design and purpose of these inventions, therefore, differ from the design and purpose of the present invention. More specifically, these devices all relate to positioning bales as they exit from a baler, mainly to position the bales correctly for stacking with a stacking machine at a later time. The present invention, on the other hand, is used in connection with stacking machines to reposition the bales after they have exited a baler to aid in the drying process and for prevention of spoilage cause by weather-related conditions.

BRIEF SUMMARY OF THE INVENTION

The present invention is a bale flipping device, comprising a first vertical bar, a second vertical bar, a third vertical bar, a fourth vertical bar, a first pivot arm, a second pivot arm, and a third pivot arm, wherein the first pivot arm connects the first vertical bar to the third vertical bar, wherein the second pivot arm connects the second vertical bar to the fourth vertical bar, and wherein the third pivot arm is parallel to the second pivot arm and also connects the second vertical bar to the fourth vertical bar. Preferably, the first pivot arm is pivotally connected to the first vertical bar and the third vertical bar, the second pivot arm is pivotally connected to the second vertical bar and the fourth vertical bar, and the third pivot arm is pivotally connected to the second vertical bar and the fourth vertical bar.

In one embodiment, the second pivot arm is pivotally connected on one end to a first joinder plate and on the other end to a second joinder plate, the first joinder plate is connected to the second vertical bar and the second joinder plate is connected to the fourth vertical bar, the third pivot arm is pivotally connected on one end to a third joinder plate and on the other end to a fourth joinder plate, the third joinder plate is connected to the fourth vertical bar and the fourth joinder plate is connected to the second vertical bar, the first pivot arm is pivotally connected on one end to a fifth joinder plate and on the other end to a sixth joinder plate, and the fifth joinder plate is connected to the first vertical bar and the sixth joinder plate is connected to the third vertical bar.

In a preferred embodiment, the present invention further comprises a first, second and third support bar, wherein the first and second support bars are parallel to each other, wherein the third support bar is angled upward toward the second support bar at either end, and wherein the first and second support bars both connect on one end to the first vertical bar and on the other end to the second vertical bar. Preferably, the present invention further comprises a metal sheet, wherein the metal sheet extends behind the first, second and third support bars. The second support bar preferably comprises a handle.

Preferably, the present invention further comprises a first deflector shield, wherein the first deflector shield extends upward from the first support bar. Preferably, the present invention further comprises a second deflector shield, wherein the second deflector shield extends upward from the second pivot arm.

In a preferred embodiment, the present invention further comprises a fourth support bar, an attachment arm, two guide arms, and a mounting bar, wherein the attachment arm and two guide arms are attached on one end to the fourth support bar, and wherein the fourth support bar is connected on one end to the point at which the fourth vertical bar joins the third pivot arm and at the other end to one end of the third vertical bar. The present invention preferably further comprises a first mounting fixture and a second mounting fixture, wherein the first and second mounting fixtures are mounted onto a stacker, and wherein the mounting bar is inserted into the first mounting fixture and the attachment arm is inserted into the second mounting fixture. The stacker comprises a first stacking table, and the guide arms preferably slide underneath the first stacking table. The stacker also comprises a trip lever, the trip lever comprises a top portion, and the trip lever is preferably modified so that the top portion can be removed. The mounting bar optionally comprises two flanges, wherein the position of the flanges relative to one another can be adjusted to account for variances in mounting the device to a stacker.

In a preferred embodiment, the present invention further comprises two gas shocks, wherein the gas shocks are parallel to and directly above the first and second pivot arms when the device is in a fully extended position. Preferably, one of the gas shocks is pivotally connected to a bracket on either end of the gas shock, and the bracket on one end of the gas shock is connected to the second pivot arm and the bracket on the other end of the gas shock is connected to the mounting bar. Preferably, the third vertical bar comprises an extension, one of the gas shocks is pivotally connected to a bracket on either end of the gas shock, and the bracket on one end of the gas shock is connected to the first pivot arm and the bracket on the other end of the gas shock is connected to the extension of the third vertical bar.

The present invention preferably further comprises a deflector guard that extends forward from the point at which the second vertical bar joins the third pivot arm. In one embodiment, the second vertical bar comprises a first ring and the second pivot arm comprises a second ring, and when the device is in a folded up position, the first and second rings line up so that a pin can be inserted through both rings.

Preferably, the fourth vertical bar comprises a first stop, the second pivot arm comprises a second stop, the third pivot arm comprises a third stop, and the second vertical bar comprises a fourth stop. The purpose of the stops is to prevent the device from extending beyond the point at which the second pivot arm is roughly perpendicular to the fourth vertical bar and the second vertical bar. Preferably, the third vertical bar comprises a fifth stop, and the first pivot arm comprises a sixth stop, and the purpose of these stops is to prevent the device from extending beyond the point at which the first pivot arm is roughly perpendicular to the first vertical bar and the third vertical bar.

REFERENCE NUMBERS

Figure 1:
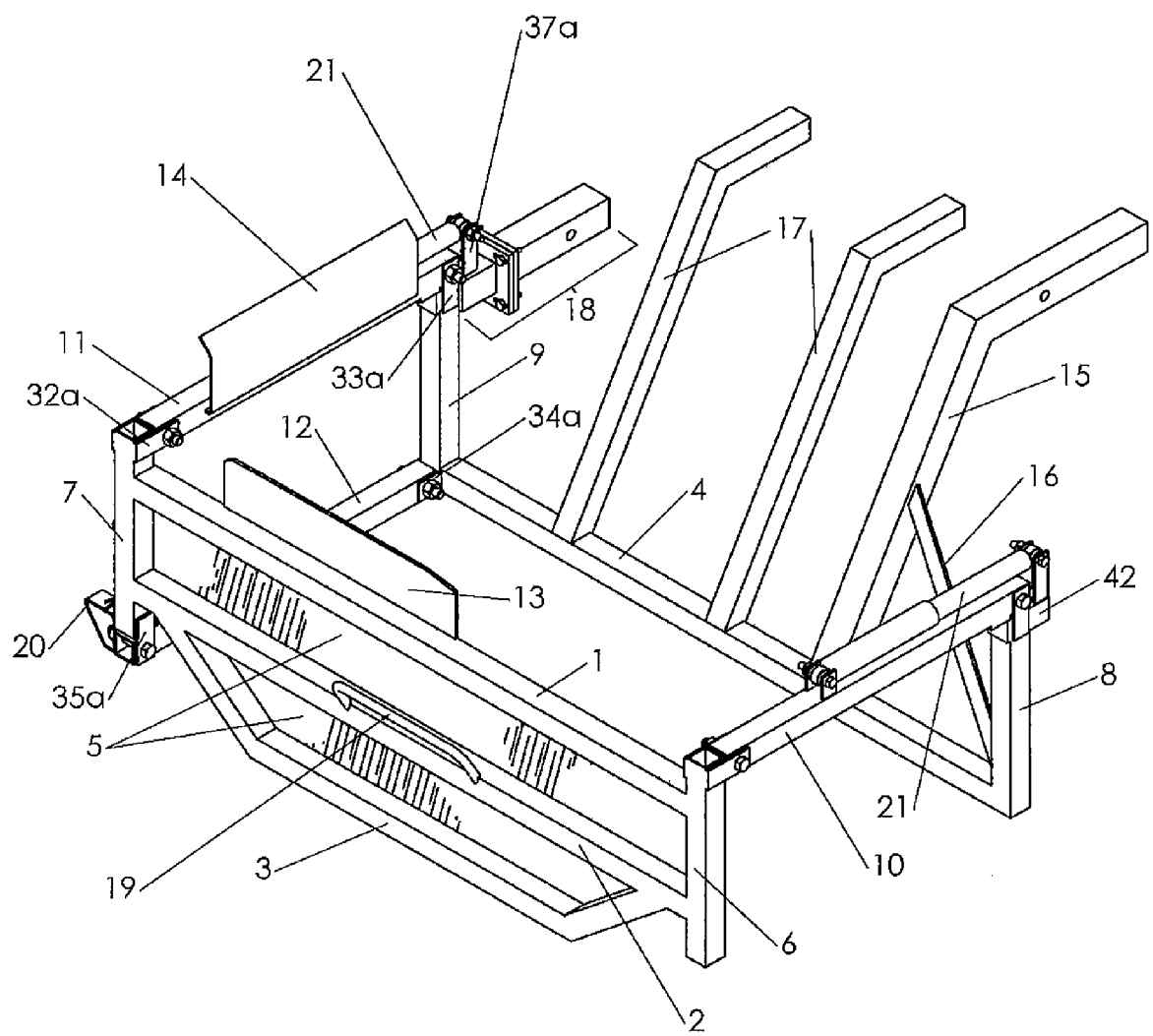
FIG. 1 is a perspective view of the present invention in a fully extended position but not installed on the stacker.

1 First support bar
2 Second support bar
3 Third support bar
4 Fourth support bar
5 Metal sheet
6 First vertical bar
7 Second vertical bar
8 Third vertical bar
9 Fourth vertical bar
10 First pivot arm
11 Second pivot arm
12 Third pivot arm
13 First deflector shield
14 Second deflector shield
14a Bracket (second deflector shield)
15 Attachment arm
16 Bracket (attachment arm)
17 Guide arm
18 Mounting bar
19 Handle
20 Deflector guard
21 Gas shock
22 Pin
23 First ring
24 Hair pin cotter
25 Second ring
26 First flange
27 Second flange
28 First stop
29 Second stop
30 Third stop
31 Fourth stop
32 First joinder plate
32a Corresponding joinder plate
33 Second joinder plate
33a Corresponding joinder plate
34 Third joinder plate
34a Corresponding joinder plate
35 Fourth joinder plate 35a Corresponding joinder plate
36 Pivot point
37 Bracket (gas shock)
37a Corresponding bracket
38 Fifth stop
39 Sixth stop
40 Fifth joinder plate
40a Corresponding joinder plate
41 Sixth joinder plate
41a Corresponding joinder plate
42 Extension
43 Cab (of stacker)
44 First stacking table
45 Second stacking table
46 Stacker
47 Trip lever
48 Top portion (of trip lever)
49 First mounting fixture
50 Second mounting fixture
51 Slot
52 Bolt
53 Round casing
54 Sleeve
55 Nut
56 Collar
57 Bottom portion (of trip lever)
58 Wire lock pin

DETAILED DESCRIPTION OF INVENTION

FIG. 1 is a perspective view of the present invention in a fully extended position but not installed on the stacker. As shown in this figure, the present invention comprises a first bar 1, a second support bar 2, and a third support bar 3. A metal sheet 5 extends behind the first, second and third support bars. The first and second support bars 1,2 are parallel to each other, but the third support bar is angled upward toward the second support bar 2 at either end. The purpose of angling the third support bar 3 at either end is to avoid digging into an obstacle when the device is in use and moving forward.

Figure 6:
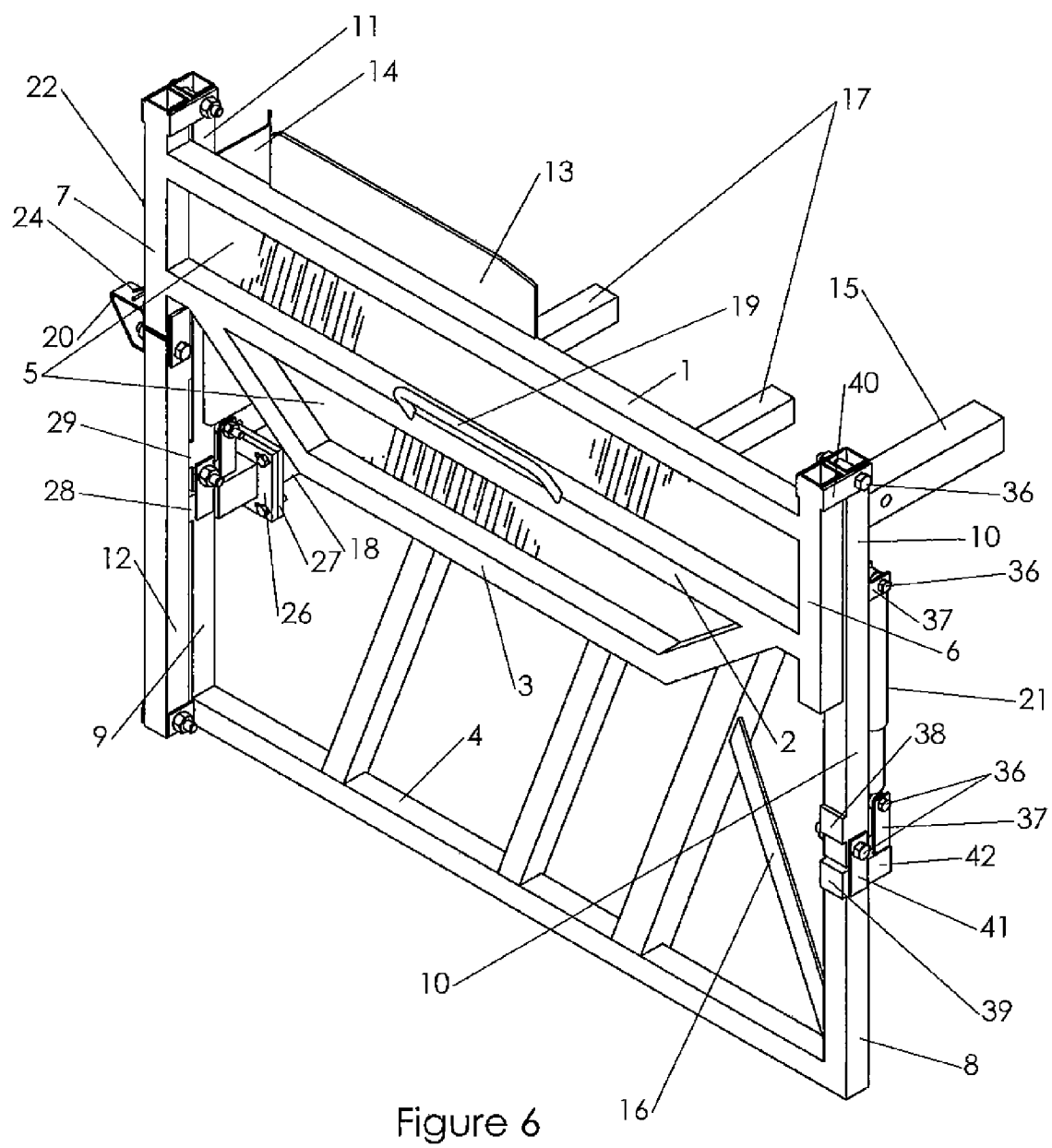
FIG. 6 is a perspective view of the present invention in a folded up position but not installed on the stacker.

The second support bar optionally comprises a handle 19, which facilitates the lifting of the device up into a folded position, as shown in FIG. 6. The first and second support bars 1, 2 both connect on one end to a first vertical bar 6 and on the other end to a second vertical bar 7. The rear side of the device (through which the bales exit when the device is installed on a stacker) comprises a first pivot arm 10, which connects the first verticle bar 6 to a third vertical bar 8. The front side of the device (shown better in FIG. 3) comprises a second pivot arm 11, which connects the second vertical bar 7 to a fourth vertical bar 9. A third pivot arm 12 is parallel to the second pivot arm 11 and also connects second vertical bar 7 to the fourth vertical bar 9. A first deflector shield 13 extends upward from the first support bar 1, and a second deflector shield 14 extends upward from the second pivot arm 11.

The present invention further comprises an attachment arm 15 and a mounting bar 18, which are used to attach the device to the stacker. Two guide arms 17 help guide the bale as it leaves the first stacking table 44 (see FIG. 11) and enters the bale flipping device. The attachment arm 15 and two guide arms 17 are attached on one end to a fourth support bar 4, which is connected on one end to the point at which the fourth vertical bar 9 joins the third pivot arm 12 and at the other end to one end of the third vertical bar 8. The attachment arm 15 is optionally secured to the fourth support bar 4 with a bracket 16.

The present invention further comprises two gas shocks 21, which are parallel to and directly above the first and second pivot arms 10, 11 when the device is in a fully extended position (as shown in FIG. 1). The purpose of the gas shocks 21 is to control the vertical movement of the device when it is being folded up or down and also when the device is in use and the deflector guard contacts a hill, bump, rock or similar obstacle. As shown more clearly in FIG. 2, the present invention preferably comprises a deflector guard 20 that extends forward from the point at which the second vertical bar 7 joins the third pivot arm 12. The purpose of the deflector guard 20 is to deflect any objects or debris that might be in the way of the device when it is installed on the stacker and moving forward. The angle of the deflector will cause the device to move vertically (as in folding up) when the device encounters an obstacle, and the gas shocks 21 will control this vertical movement.

Figure 2:
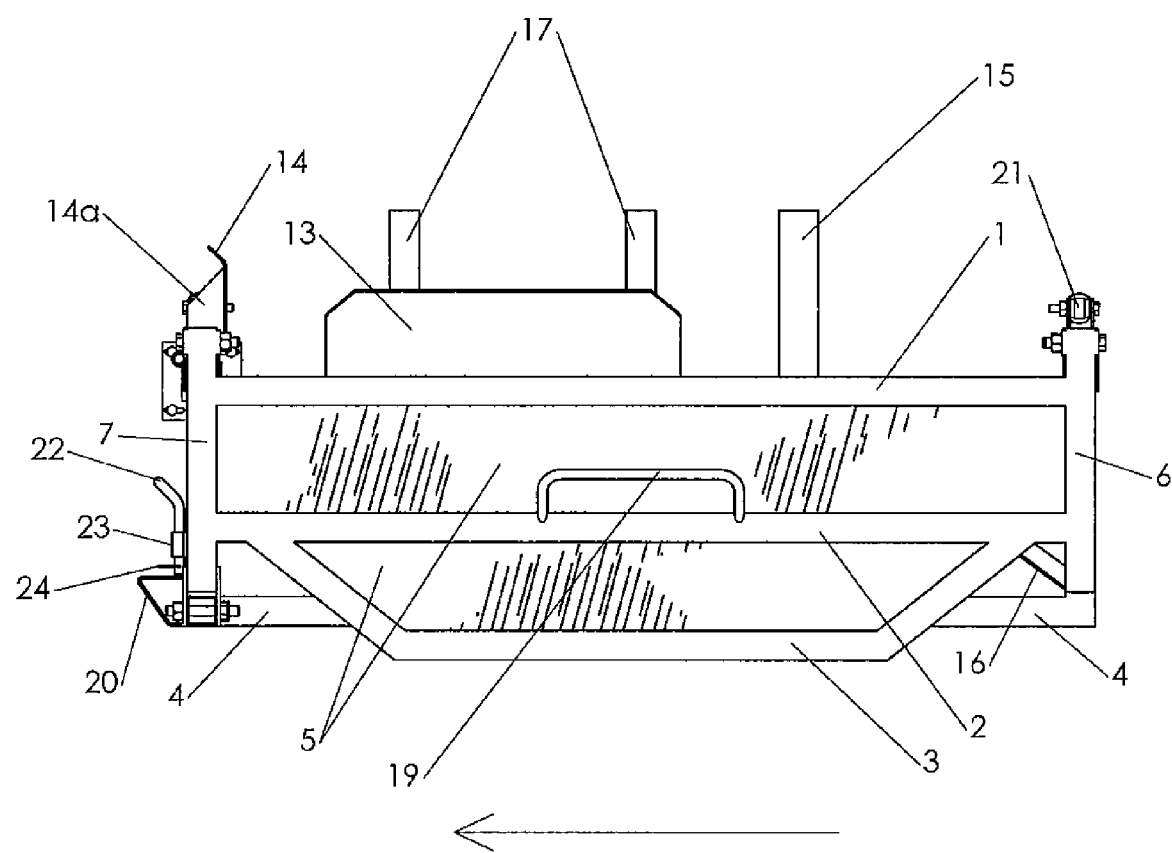
FIG. 2 is a side view of the present invention in a fully extended position but not installed on the stacker.

FIG. 2 is a side view of the present invention in a fully extended position but not installed on the stacker. When in use, the direction of travel of the stacker (and of the device) is as indicated by the arrow. As shown in this figure, the present invention preferably comprises a pin 22, which extends through a first ring 23 and is held in place by a hair pin cotter 24. The function of the pin 22 is discussed in connection with FIG. 6.

Figure 3:
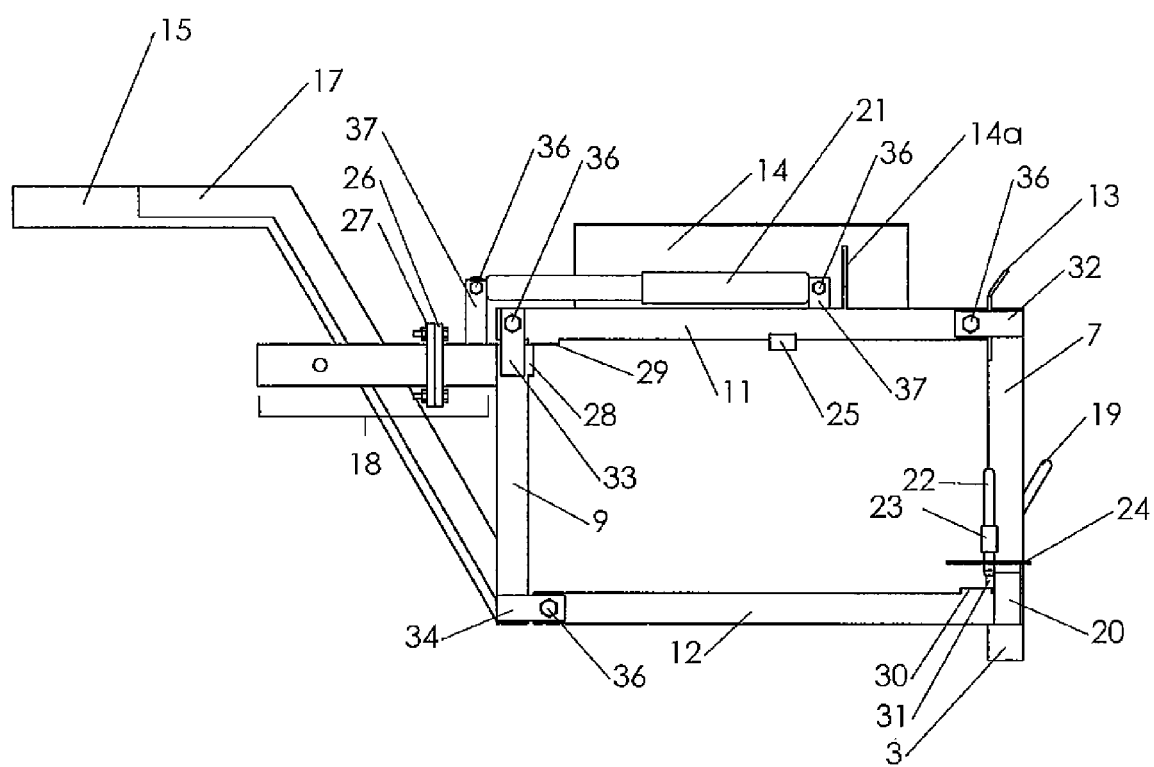
FIG. 3 is a front view of the present invention in a filly extended position but not installed on the stacker.
Figure 8:
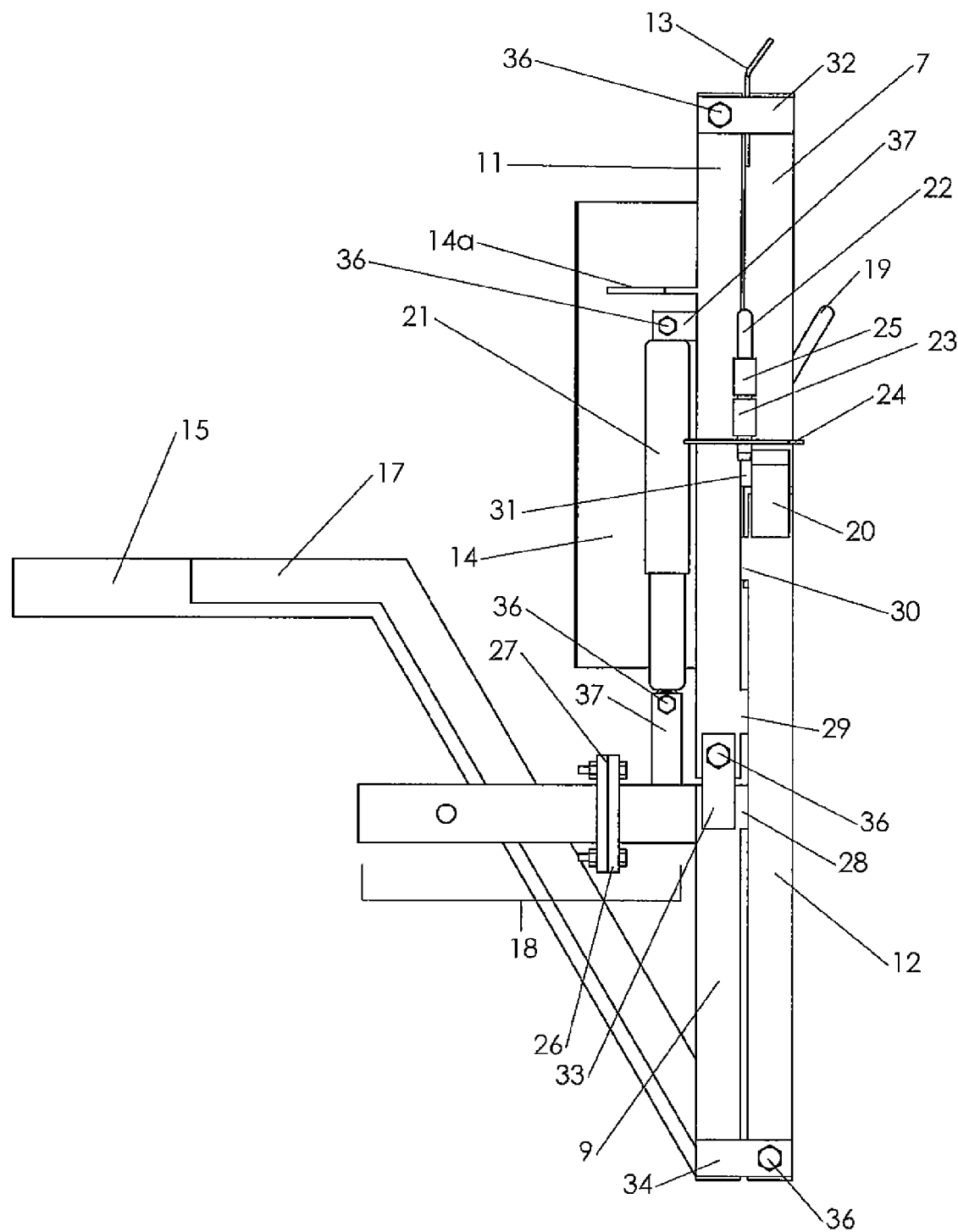
FIG. 8 is a front view of the present invention in a folded up position but not installed on the stacker.

FIG. 3 is a front view of the present invention in a fully extended position but not installed on the stacker. As discussed in connection with FIG. 2, the present invention comprises a first ring 23 through which the pin 22 extends. The first ring 23 is located on the second vertical bar 7. A second ring 25 is located on the second pivot arm 11. When the device is in a folded up position (as shown in FIG. 8), the first and second rings 23, 25 line up so that the pin 22 extends through both rings and is secured in place by the hair pin cotter 24.

As shown in FIG. 3, the mounting bar 18 comprises a first flange 26 and a second flange 27. The purpose of the first and second flanges 26, 27 will be discussed in connection with FIGS. 18 and 19. The second deflector shield 14 is preferably supported by a bracket 14a.

FIG. 3 also shows a first stop 28, a second stop 29, a third stop 30, and a fourth stop 31. The fourth stop 31 is partially obscured from view by the pin 22 and hair pin cotter 24. The first, second, third and fourth stops 28, 29, 30, 31 are located on the fourth vertical bar 9, second pivot arm 11, third pivot arm 12, and second vertical bar 7, respectively. The purpose of the stops is to prevent the device from collapsing beyond the position shown in FIG. 3.

The present invention further comprises a first joinder plate 32, a second joinder plate 33, a third joinder plate 34, and a fourth joinder plate 35 (not shown). In FIG. 3, the fourth joinder plate 35 is obscured by the deflector guard 20. Each joinder plate comprises a pivot point 36. The first joinder plate 32 connects the second vertical bar 7 to the second pivot arm 11. The second joinder plate 33 connects the fourth vertical bar 9 to the second pivot arm 11. The third joinder plate 34 connects the fourth vertical bar 9 to the third pivot arm 12. The fourth joinder plate 35 (not shown) connects the second vertical bar 7 to the third pivot arm 12.

Figure 4:
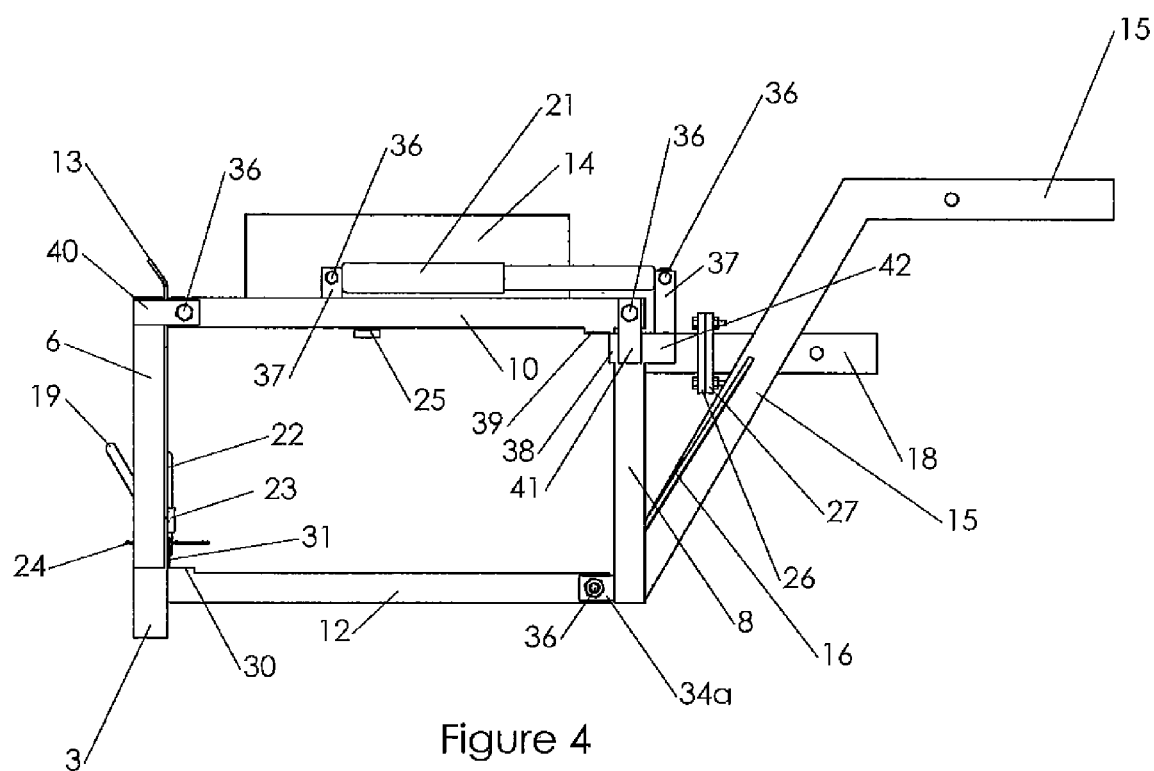
FIG. 4 is a rear view of the present invention in a fully extended position but not installed on the stacker.

Although not shown in this figure, for each joinder plate, there is a corresponding joinder plate on the other side of the pivot arm and vertical bar to which the joinder plate attaches. Thus, there are actually four sets of joinder plates on the front side of the present invention, and two sets of joinder plates on the rear side (see FIG. 4). For example, the corresponding joinder plate to joinder plate 34 is shown in FIG. 4 and labeled as joinder plate 34a. The corresponding joinder plate to joinder plate 32 is shown in FIG. 1 and labeled as joinder plate 32*a*. The corresponding joinder plate to joinder plate 33 is shown in FIG. 1 and labeled as joinder plate 33*a*. The corresponding joinder plate to joinder plate 35 is shown in FIG. 1 and labeled as joinder plate 35*a*. For ease of reference, each set of joinder plates will be referred to hereinafter simply by referring to one joinder plate in the set.

Figure 3A:
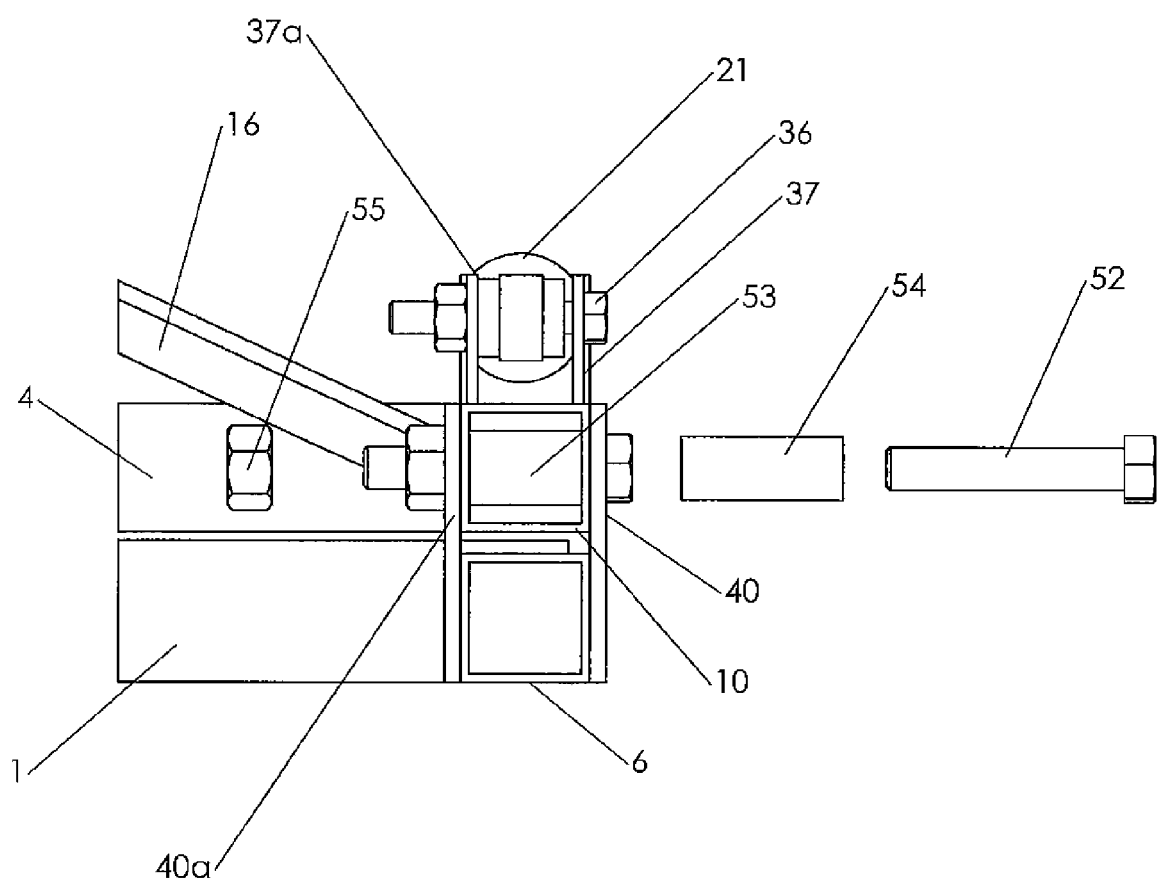
FIG. 3A is an exploded view of one embodiment of the pivot point of the present invention.

The present invention is not limited to any particular manner of implementing the pivot points between the joinder plates and the pivot arms, but a preferred embodiment is shown in FIG. 3A. In this figure, the pivot point is effectuated by welding a round casing 53 inside the square tubing that comprises the first, second or third pivot arms 10, 11, 12. A sleeve 54 is inserted into the casing 53, and a bolt 52 is inserted inside the sleeve 54 and secured with a nut 55. The joinder plate 40 lies between the head of the bolt 52 and the outside of the square tubing, as shown in FIG. 3A. The corresponding joinder plate 40*a* lies between the nut 55 and the outside of the square tubing. In this manner, the sleeve is allowed to rotate inside the casing, which causes the pivot arms to rotate relative to the joinder plates.

The gas shock 21 is pivotally connected on each end to a bracket 37. Each bracket comprises a pivot point 36. One bracket connects the gas shock 21 to the second pivot arm 11, and the other bracket connects the gas shock 21 to the mounting bar 18. For each bracket 37, there is a corresponding bracket 37*a* (see FIG. 1) on the other side of the gas shock 21. Altogether, there are six pivot points 36 in the front view of the present invention.

FIG. 4 is a rear view of the present invention in a fully extended position but not installed on the stacker. This figure shows the fifth and sixth stops 38, 39, which serve the same purpose as the stops discussed in connection with FIG. 3. It also shows the fifth and sixth joinder plates 40, 41, both of which comprise pivot points 36. The fifth joinder plate 40 connects the first vertical bar 6 to the first pivot arm 10. The sixth joinder plate 41 connects the third vertical bar 8 to the first pivot arm 10. As discussed in connection with FIG. 3, there are corresponding joinder plates (not shown) on the other side of the first pivot arm 10 and first and third vertical bars 6, 8.

The gas shock 21 that lies directly above the first pivot arm 10 is pivotally connected on each end to a bracket 37. Each bracket comprises a pivot point 36. One bracket connects the gas shock 21 to the first pivot arm 10, and the other bracket connects the gas shock 21 to an extension 42 (also shown in FIG. 1) of the third vertical bar 8. Thus, there are four pivot points 36 in the rear view of the present invention. As discussed in connection with FIG. 3, there are corresponding brackets 37 on the other side of the gas shock 21.

Figure 5:
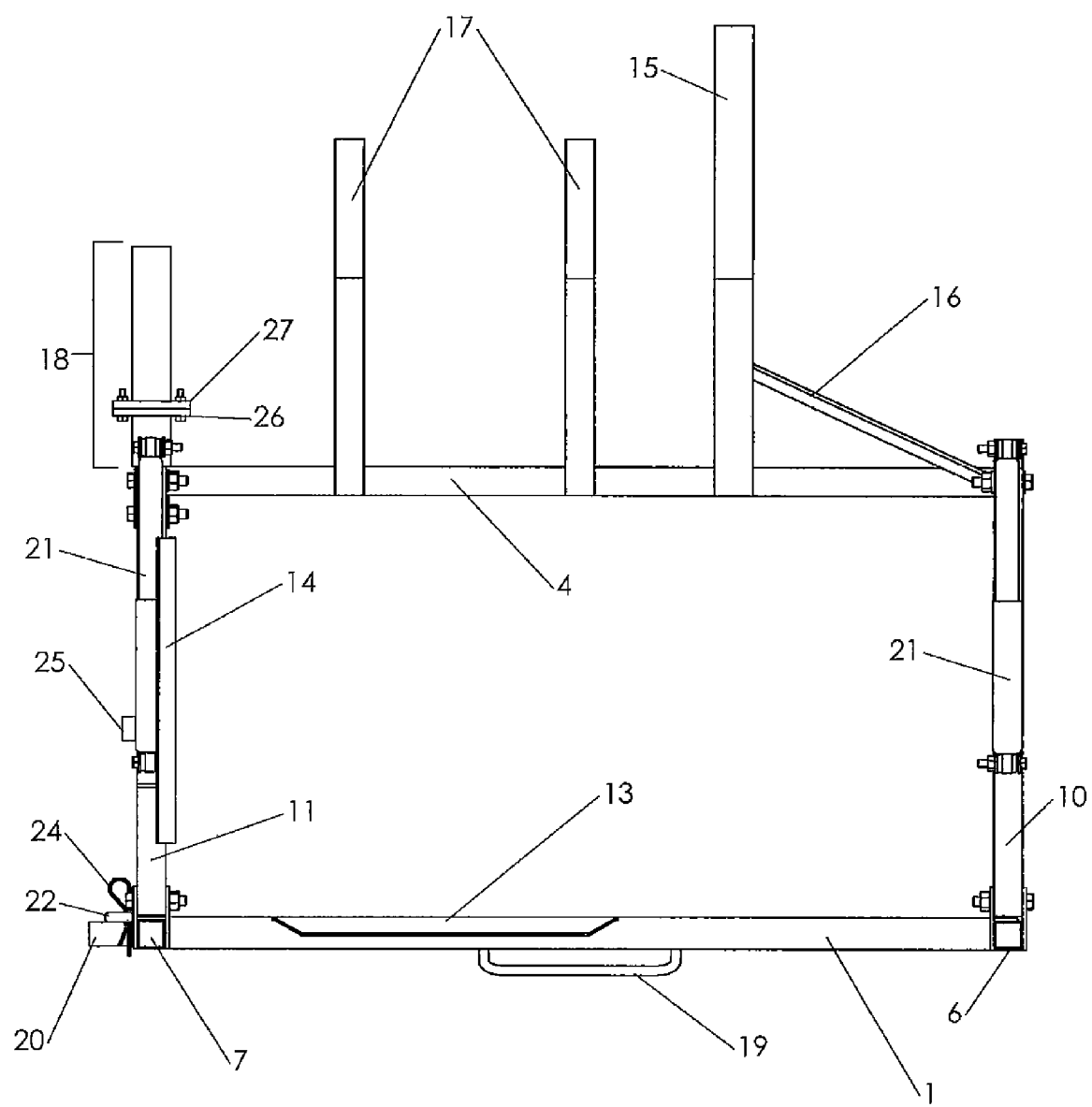
FIG. 5 is a top view of the present invention in a fully extended position but not installed on the stacker.

FIG. 5 is a top view of the present invention in a fully extended position but not installed on the stacker. All parts shown in this figure have been previously discussed.

FIG. 6 is a perspective view of the present invention in a folded up position but not installed on the stacker. To convert the device from a fully extended to a folded up position, the user simply pulls up on the handle 19, and the pivot points 36 allow the entire device to be folded up as shown in FIG. 6. To secure the device in this position, the pin 22 (shown better in FIG. 8) is inserted through both rings 23, 25 (see FIG. 8), and then the hair pin cotter 24 is reinserted through the pin 22. In order for the device to fold up as shown in this figure, the first, second, third and fourth vertical bars 6, 7, 8, 9 all have to be the same length, and the first, second and third pivot arms 10, 11, 12 all have to be the same length. In addition, the first joinder plate 32 and the third joinder plate 34 are preferably the same length, as are the second joinder plate 33 and the fourth joinder plate 35. The fifth joinder plate 40 is preferably the same length as the width of the third vertical bar 8 plus the extension 42.

Figure 7:
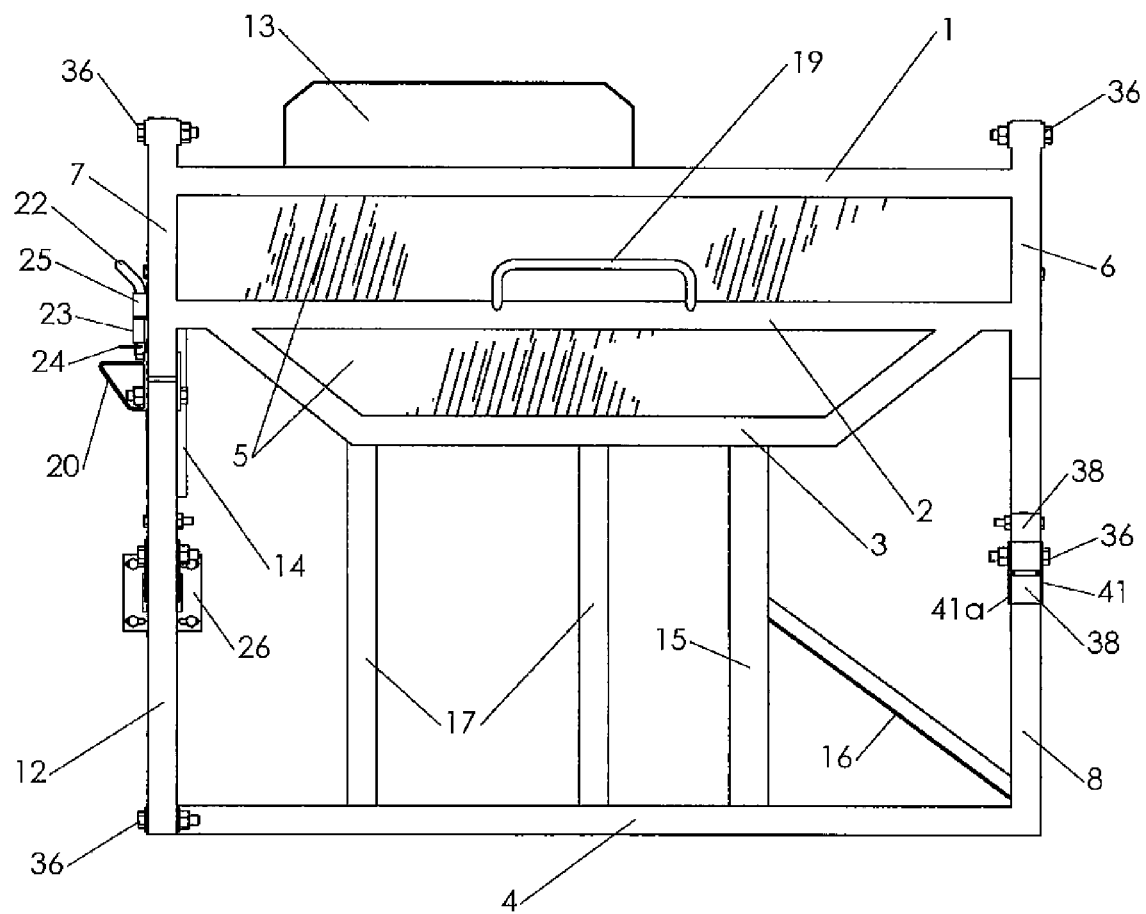
FIG. 7 is a side view of the present invention in a folded up position but not installed on the stacker.

FIG. 7 is a side view of the present invention in a folded up position but not installed on the stacker. This figure shows the pin 22 inserted into both rings 23, 25 to secure the device in position.

FIG. 8 is a front view of the present invention in a folded up position but not installed on the stacker. The pin 22 is preferably bent on one end (to keep it from dislodging) and has a hole on the other end, through which the hair pin cotter 24 is inserted. As discussed more fully in connection with FIGS. 18 and 19, the position of the flanges 26, 27 in relation to one another can be adjusted to accommodate for variances in mounting the device to the stacker.

Figure 9:
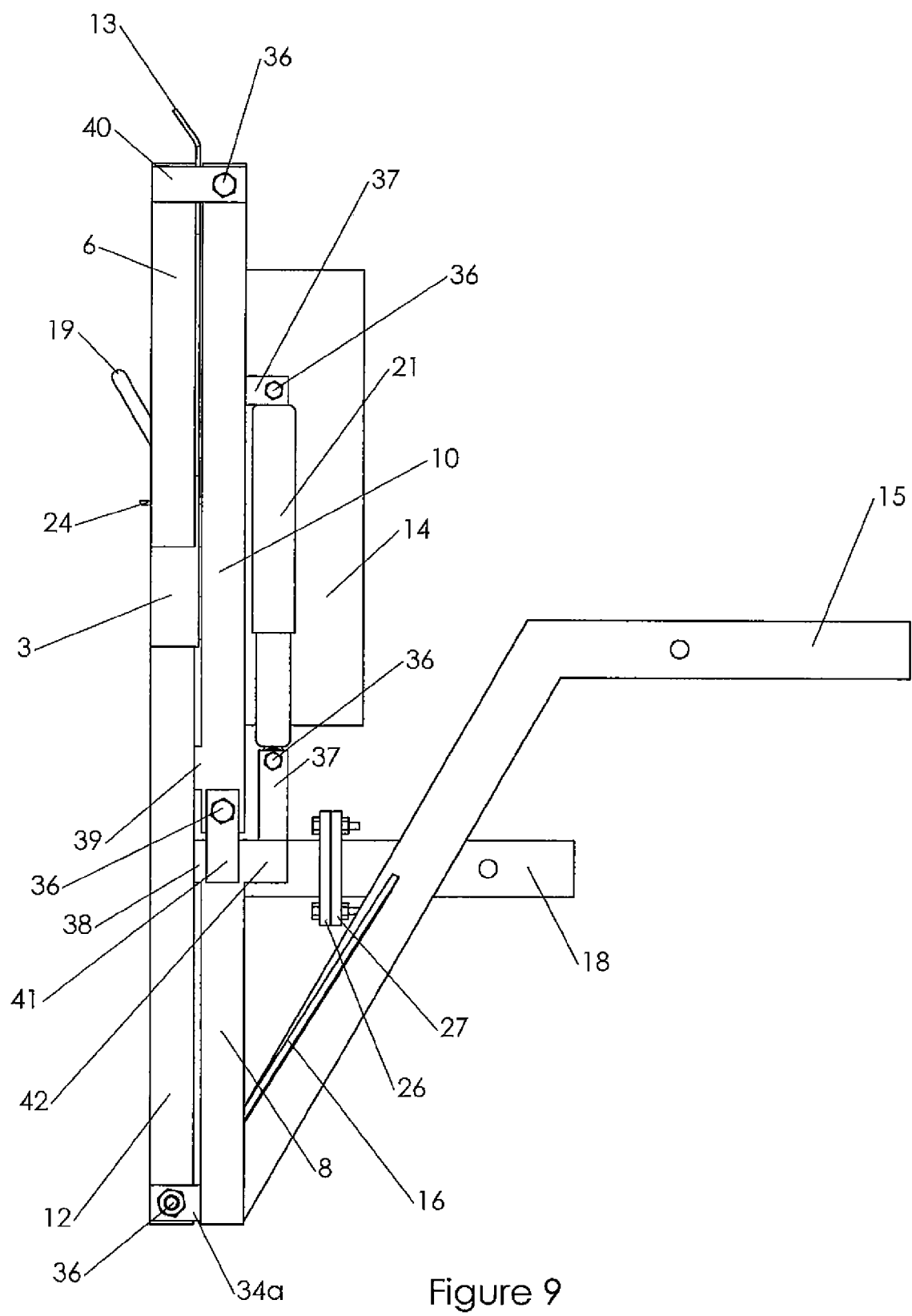
FIG. 9 is a rear view of the present invention in a folded up position but not installed on the stacker.
Figure 10:
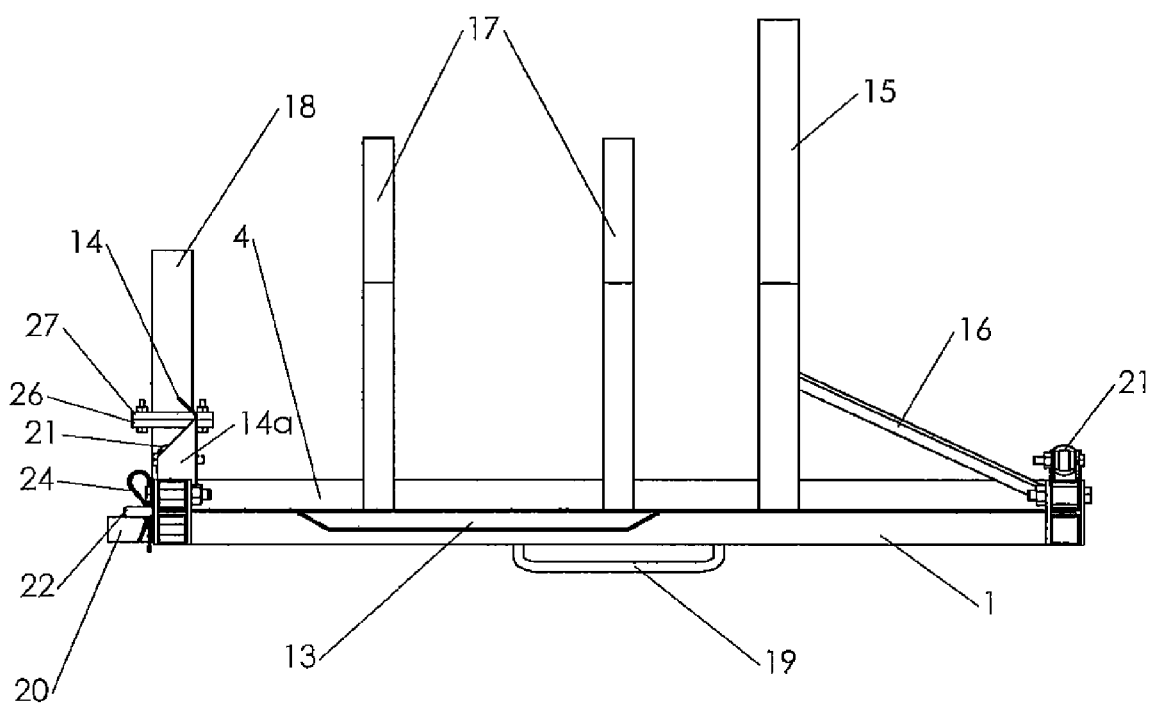
FIG. 10 is a top view of the present invention in a folded up position but not installed on the stacker.

FIG. 9 is a rear view of the present invention in a folded up position but not installed on the stacker. This figure illustrates the relatively modest profile of the device when it is in a folded up position. When installed on the stacker, the device adds just a few inches to the overall width of the stacker. FIG. 10 is a top view of the present invention in a folded up position but not installed on the stacker.

Figure 11:
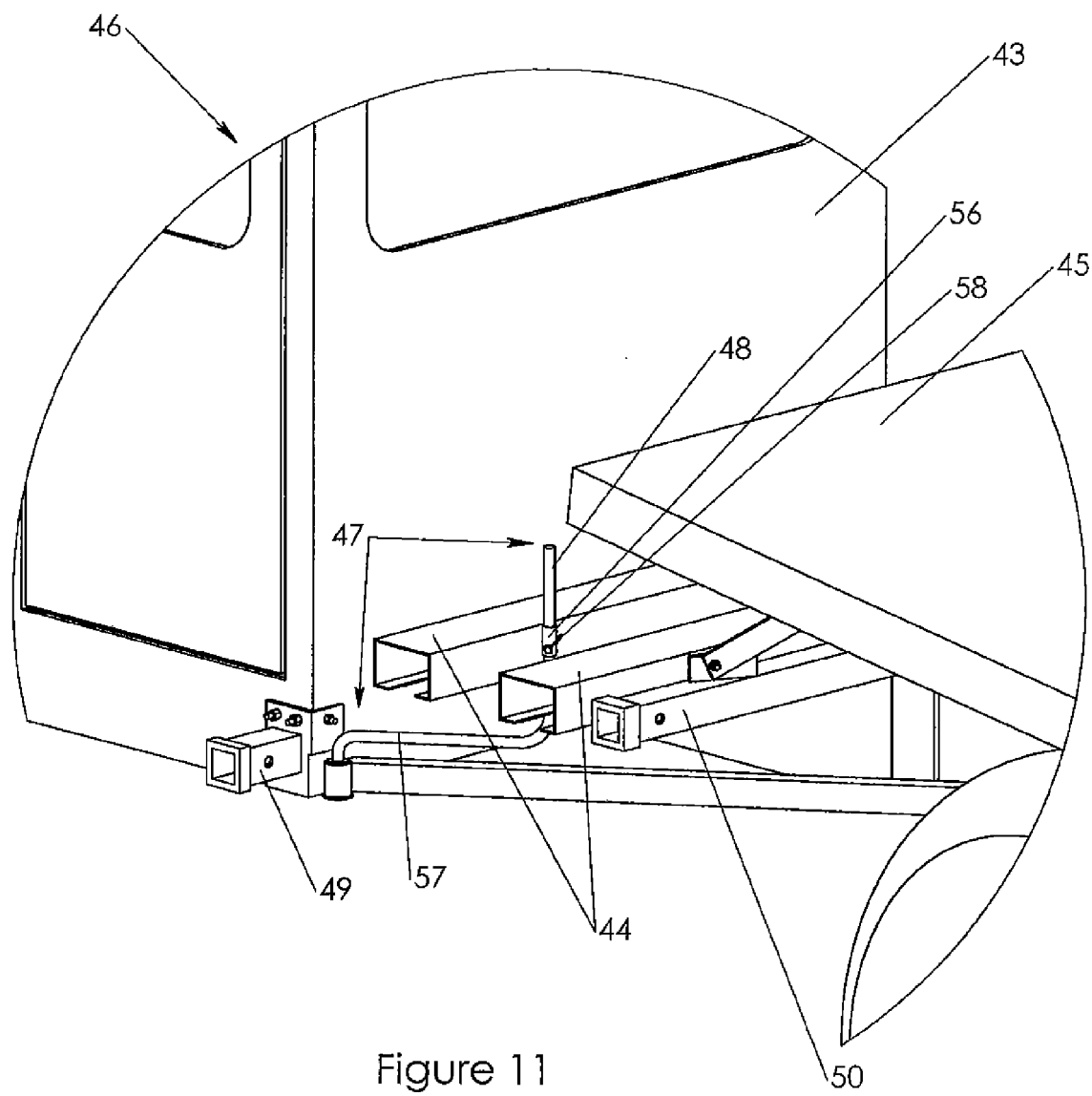
FIG. 11 is a perspective view of the area of the stacker to which the present invention is attached.
Figure 11A:
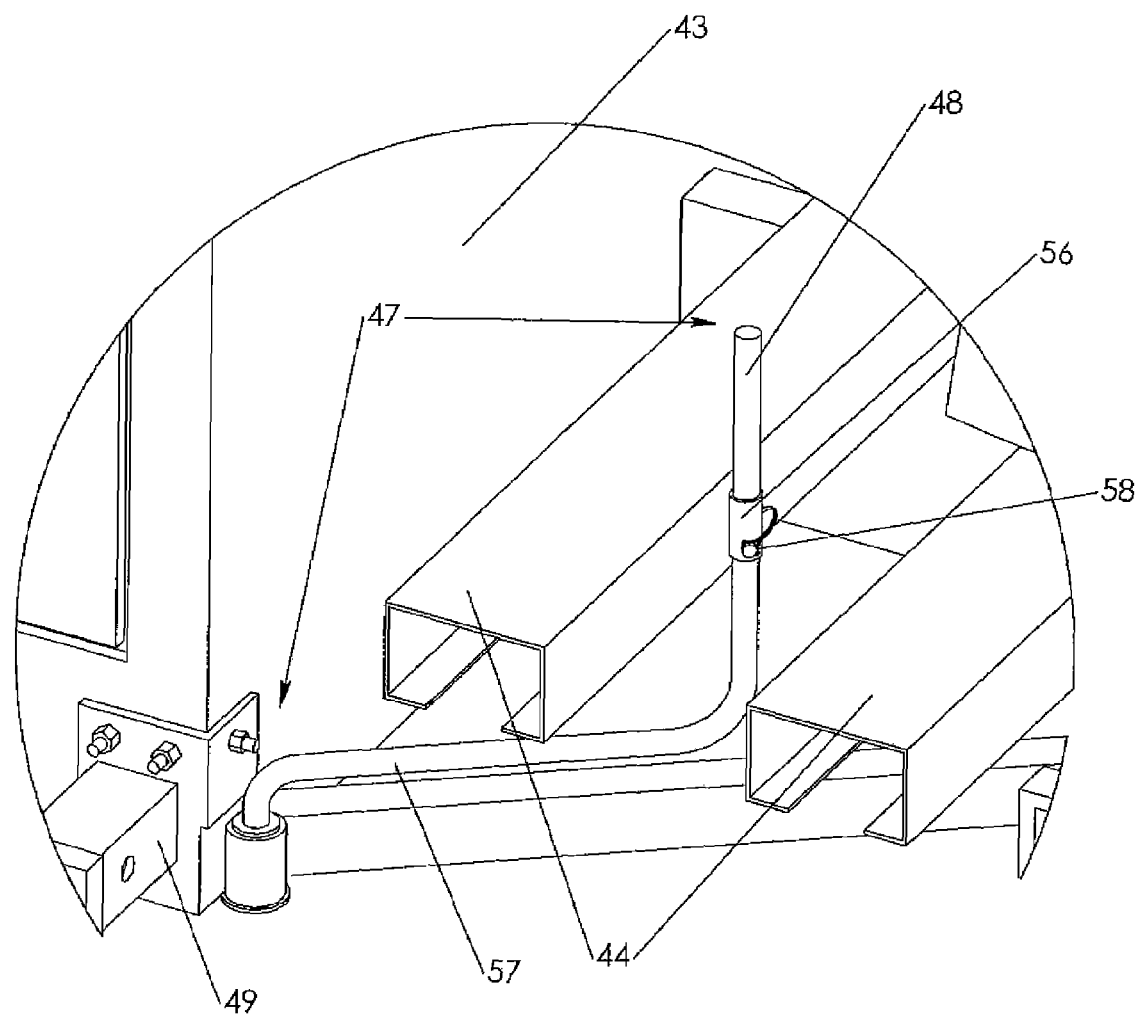
FIG. 11A is a detail view of the modified trip lever of the present invention.

FIG. 11 is a perspective view of the area of the stacker to which the present invention is attached. This figure shows the cab 43, first stacking table 44, and second stacking table 45 of the stacker 46. It also shows the trip lever 47, which has been modified so that the top portion 48 of the trip lever 47 is removable (see FIG. 12). The trip lever 47 comes from the factory as one solid piece. In order to modify the trip lever 47 for use with the present invention, the top portion 48 of the trip lever is cut off from the rest of the trip lever, a collar 56 is welded onto the bottom end of the top portion 48, and a hole is drilled through the collar 56 and through the top end of the bottom portion 57 of the trip lever. The collar 56 is then positioned directly on top of the bottom portion 57 of the trip lever, and a wire lock pin 58 or other suitable fastening means is inserted through the hole in the collar 56 and in the bottom portion 57 of the trip lever, thereby securing the top portion 48 of the trip lever on top of the bottom portion 57. The top portion 48 is removed by removing the wire lock pin 58 and then removing the top portion 48. FIG. 11A shows the modified trip lever in greater detail than FIG. 11.

Two mounting fixtures 49, 50 have been affixed to the stacker. The first mounting fixture 49 is mounted on the frame of the cab 43. The second mounting fixture 50 is mounted adjacent to the first stacking table 44. The manner in which the first and second mounting fixtures 49, 50 are mounted onto the stacker may change with different models of the New Holland small bale stacker, and the present invention is not limited to any particular manner of attaching the first and second mounting fixtures 49, 50 to the stacker.

Figure 12:
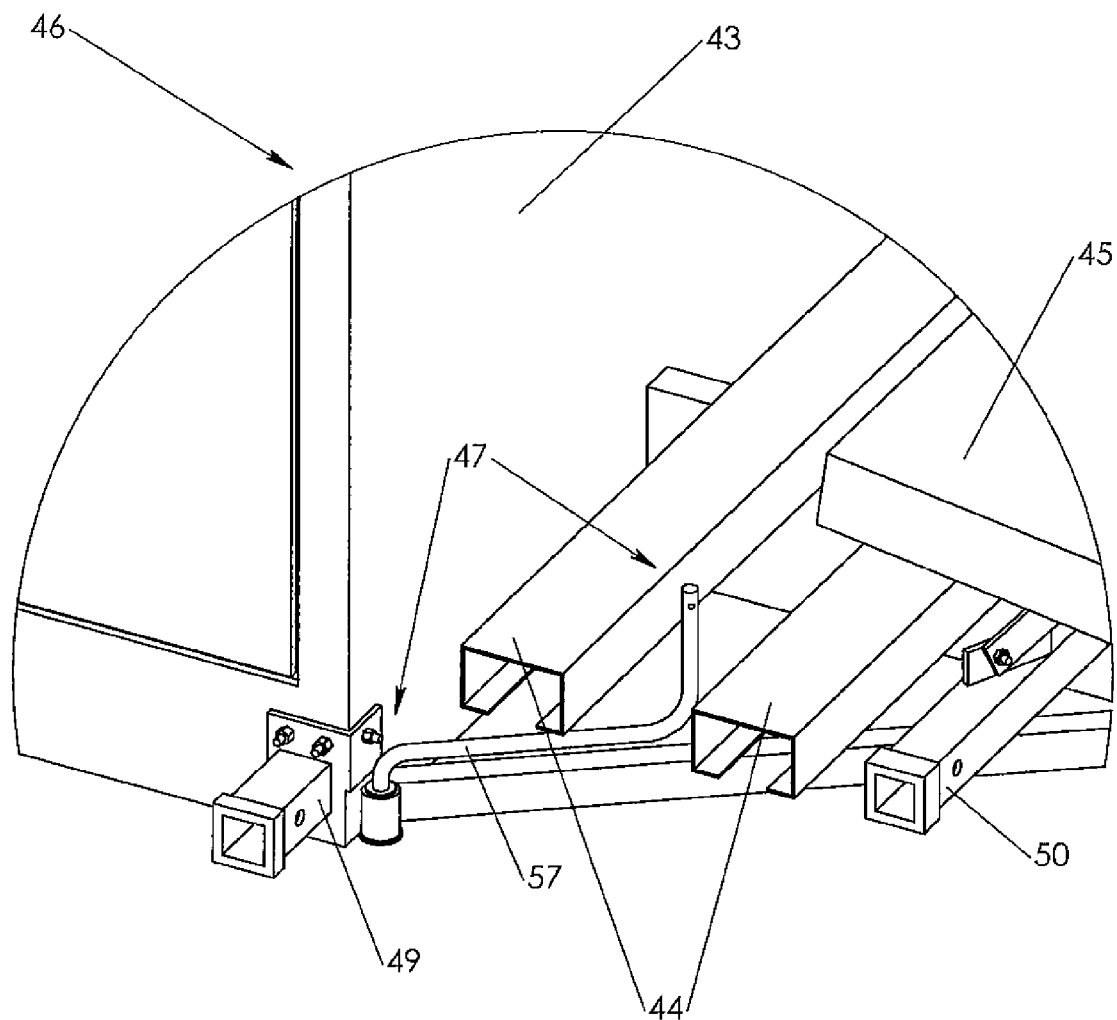
FIG. 12 is a perspective view of the area of the stacker to which the present invention is attached with the top portion of the trip lever removed.

FIG. 12 is a perspective view of the area of the stacker to which the present invention is attached with the top portion of the trip lever removed. This modification is necessary to allow the bales to slide from the first stacking table 44 into the bale flipping device (see FIG. 13). To stack bales, the operator need only leave the device in a folded up position (see FIG. 16) and leave the top portion 48 of the trip lever 47 on. In that manner, the bales will trip the trip lever 47, which in turn causes the stacker 46 to stack the bales on the second stacking table 45. Thus, to use the present invention, the only modifications that are necessary to the stacker 46 are the installation of the first and second mounting fixtures 49, 50 and the modification of the trip lever 47 to allow for removal of the top portion 48.

Figure 13:
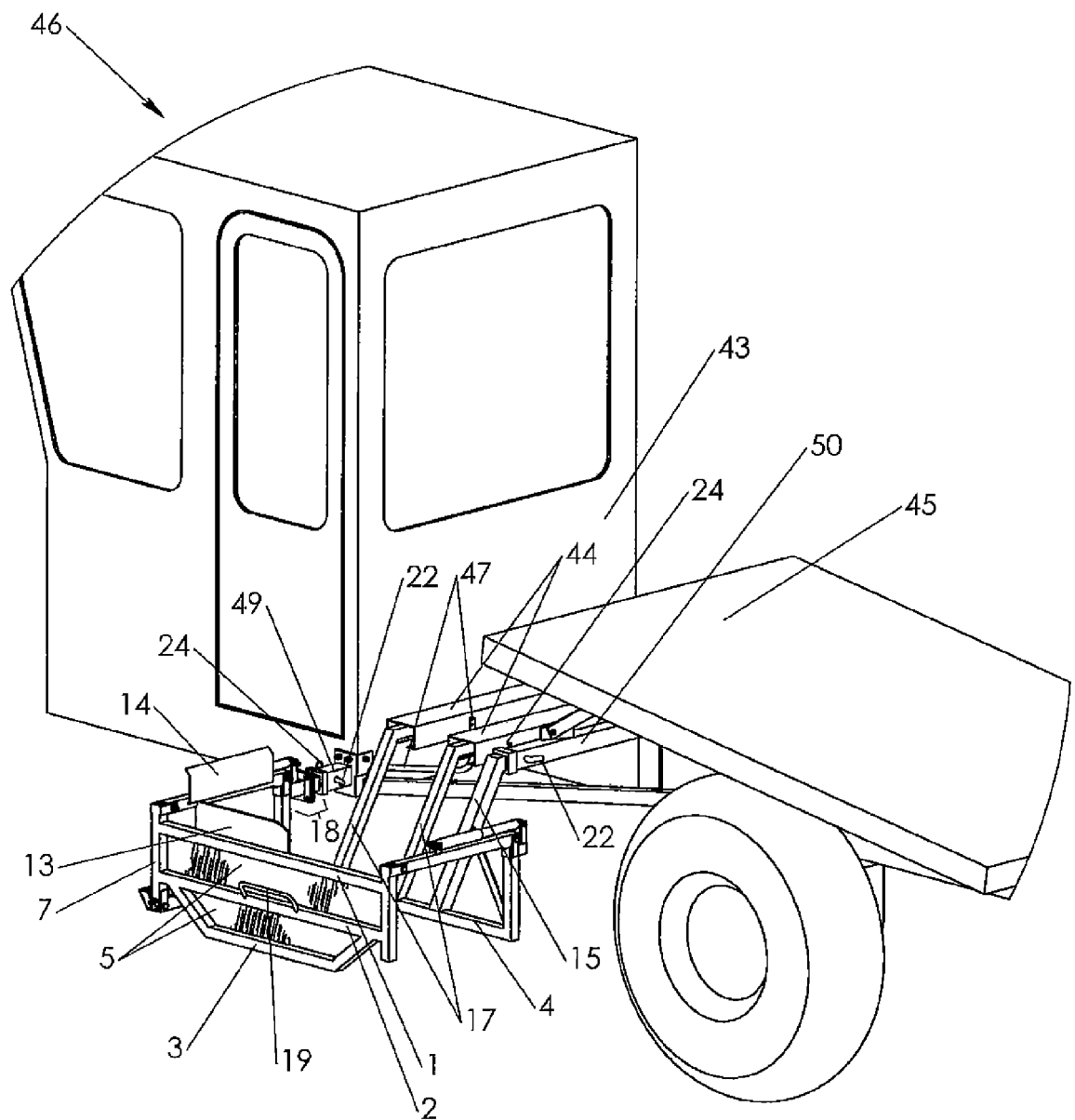
FIG. 13 is a perspective view of the present invention in a fully extended position installed on the stacker.
Figure 14:
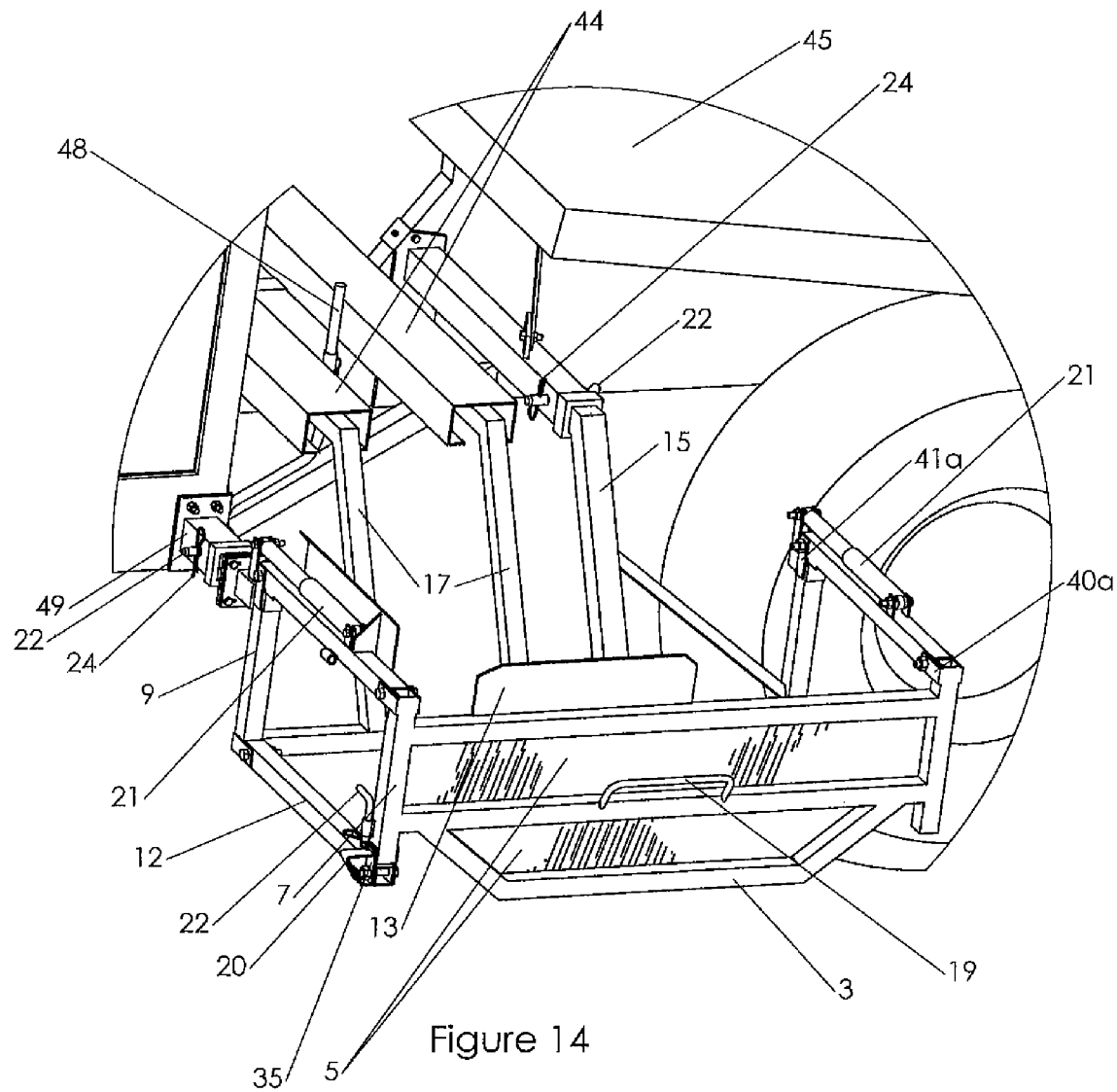
FIG. 14 is an alternate perspective view of the present invention in a fully extended position installed on the stacker.

FIG. 13 is a perspective view of the present invention in a fully extended position installed on the stacker. FIG. 14 is an alternate perspective view of the present invention in a fully extended position installed on the stacker. As shown in these figures, to install the present invention on the stacker, the attachment arm 15 is inserted into the second mounting fixture 50. The guide arms 17 each slide underneath the first stacking table 44, and the mounting bar 18 is inserted into the first mounting fixture 49. A pin 22 is inserted through second mounting fixture 50 and attachment arm 15, as well as through the first mounting fixture 49 and mounting bar 18, and a hair pin cotter 24 holds each pin 22 in place.

Figure 15:
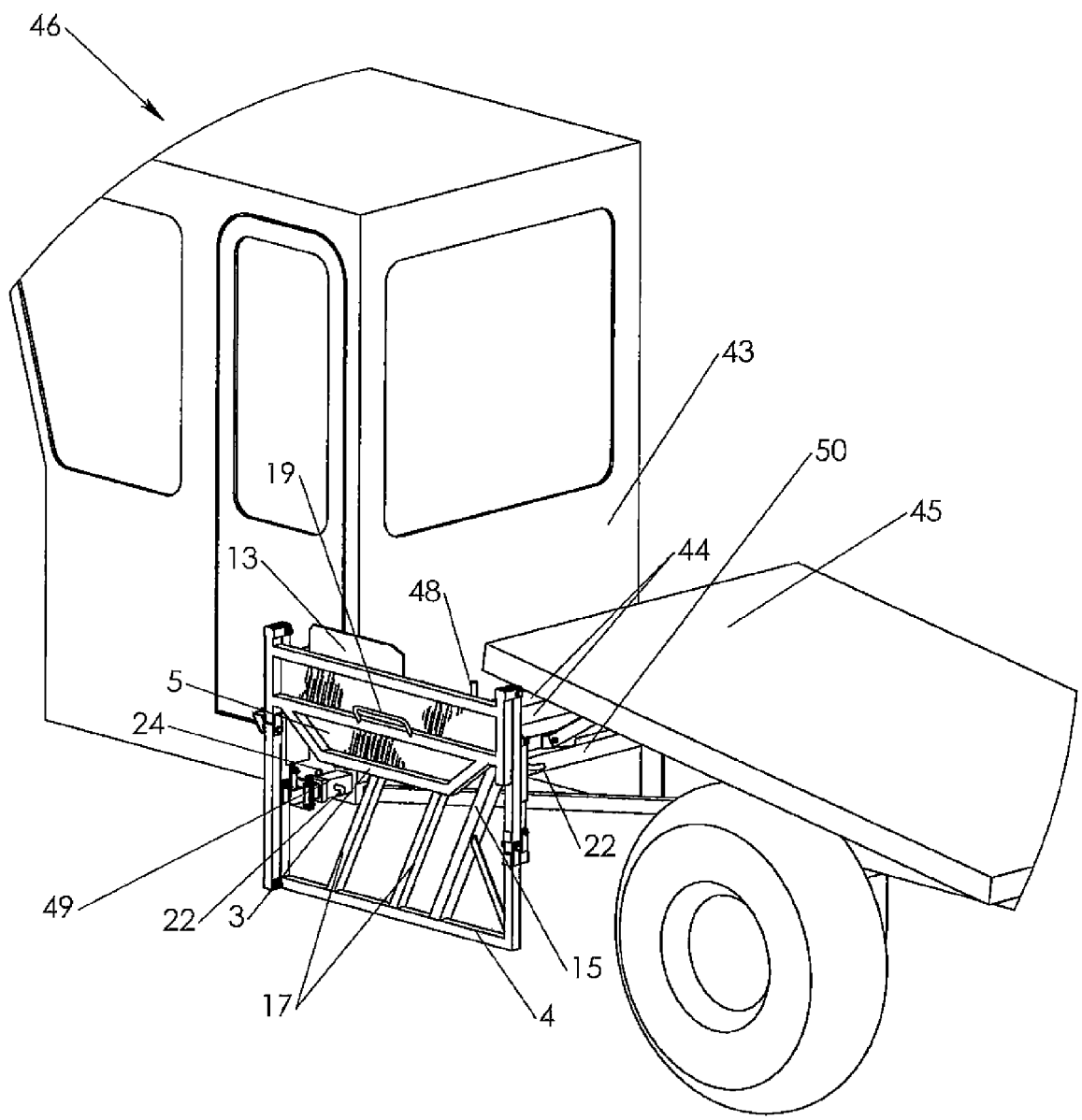
FIG. 15 is a perspective view of the present invention in a folded up position installed on the stacker.

FIG. 15 is a perspective view of the present invention in a folded up position installed on the stacker. The device is folded up in the same manner discussed in connection with FIG. 6.

Figure 16:
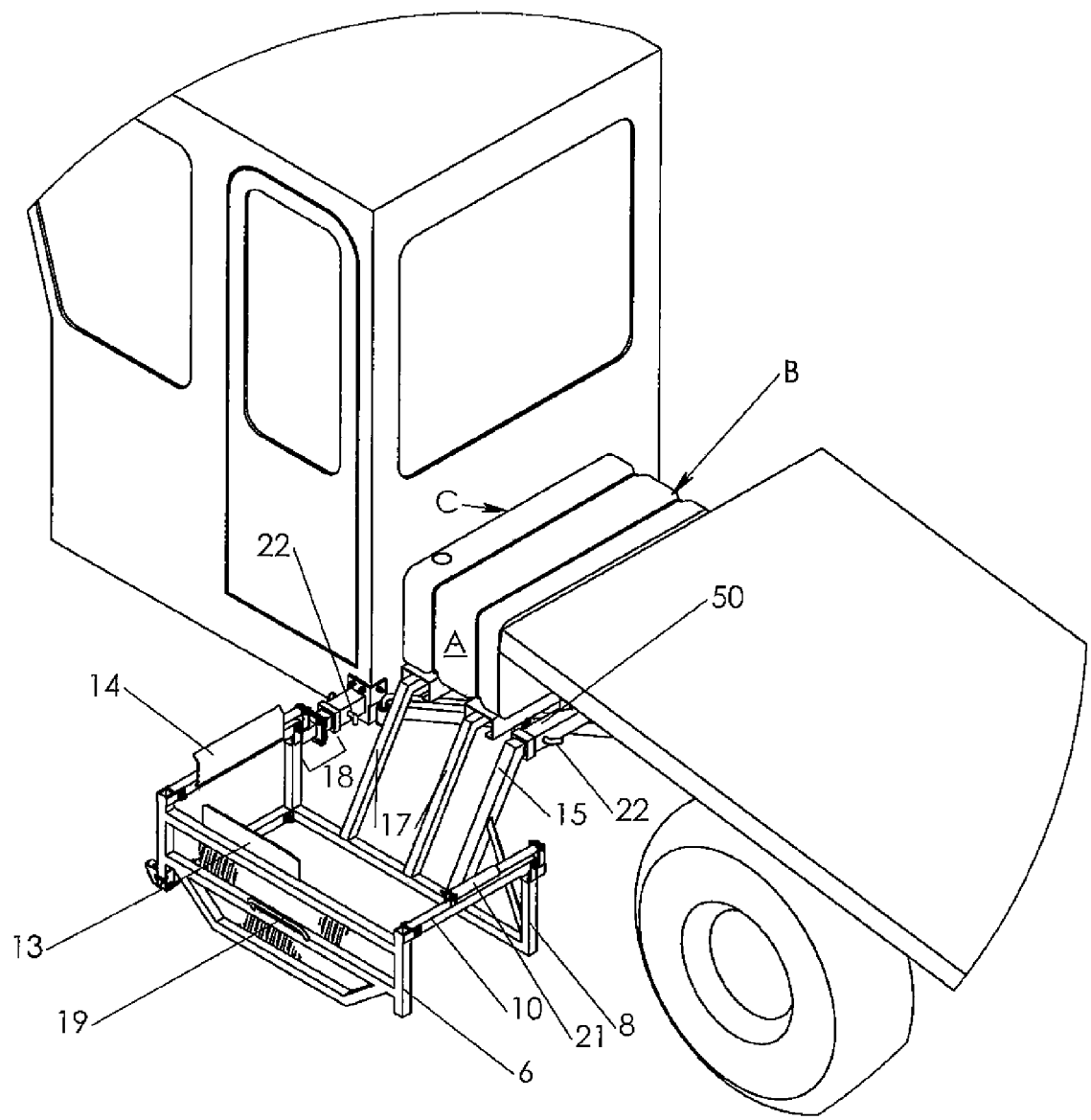
FIG. 16 is a perspective view of the present invention in a fully extended position installed on the stacker and shown with a bale on the first stacking table.
Figure 17:
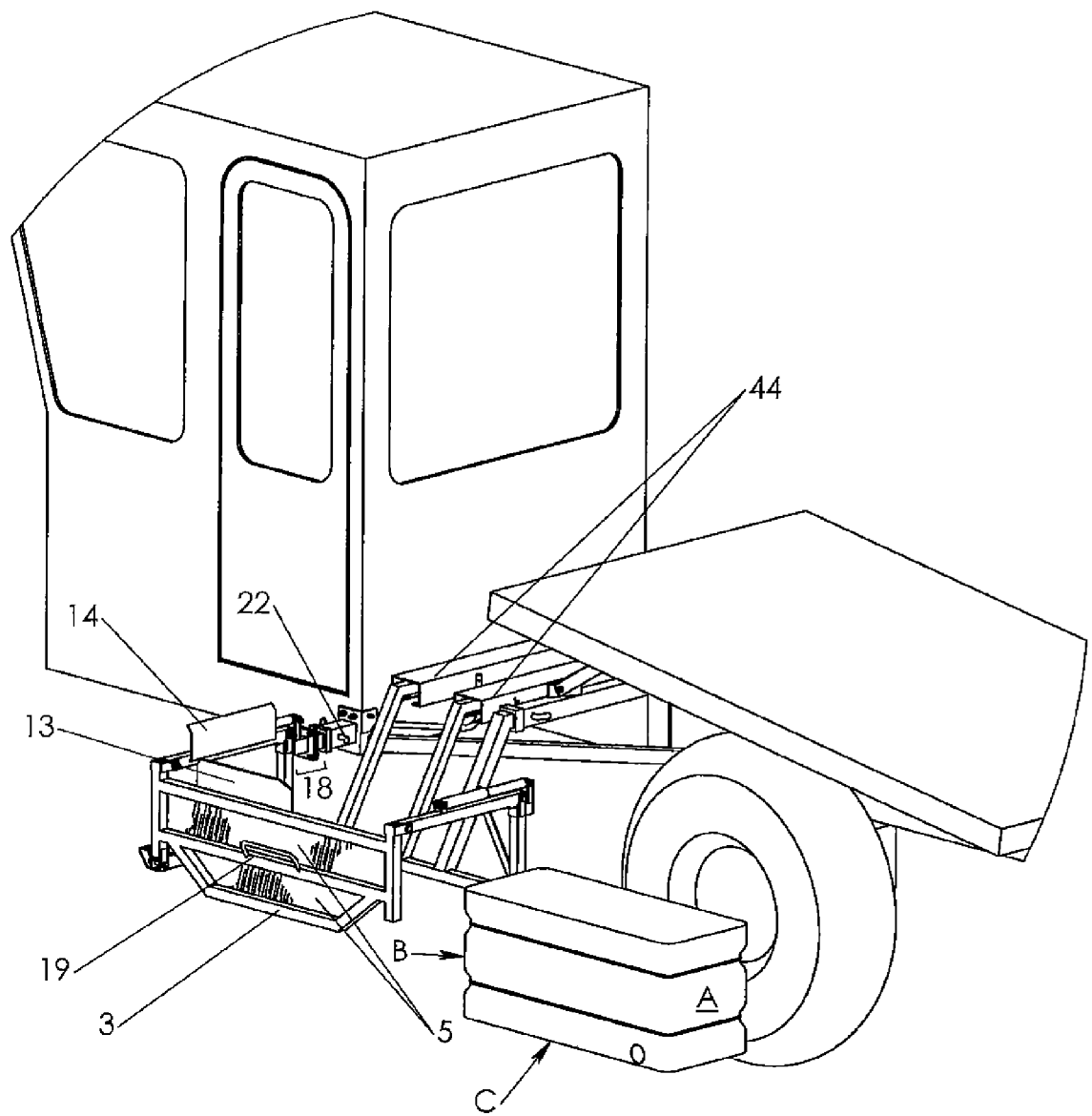
FIG. 17 is a perspective view of the present invention in a fully extended position installed on the stacker and shown with a bale just after it has exited the device of the present invention.

FIGS. 16 and 17 illustrate the manner in which a bale is flipped by the present invention. FIG. 16 is a perspective view of the present invention in a fully extended position installed on the stacker and shown with a bale on the first stacking table 44. As the bale drops into the flipping device, the first end (marked "A") of the bale hits the first deflector shield 13 and drops to the ground. As the stacker moves forward, the far end (marked "B") of the bale hits the second deflector shield 14, and the side marked "C" drops to the ground. The bale then exits through the gap formed by the first pivot arm 10, the first vertical bar 6, and the third vertical bar 8, thereby flipping the bale.

FIG. 17 is a perspective view of the present invention in a fully extended position installed on the stacker and shown with a bale just after it has exited the device of the present invention. The circle on the bale has been added to illustrate the positioning of the bale before entering the flipping device (when the bale is still on the first stacking table 44, as shown in FIG. 16) and after exiting the flipping device (as shown in FIG. 17). Before the bale is picked up by the stacker, the bale is located on the ground on the opposite side of the stacker from that shown in FIG. 17. In that position, the circle on the bale would be located in the top, left-hand corner of the outside face of the bale (from the perspective of someone facing the opposite side of the stacker to that shown in FIG. 17), as opposed to the bottom, right-hand corner of the outside face of the bale, as shown in FIG. 17.

Figure 18:
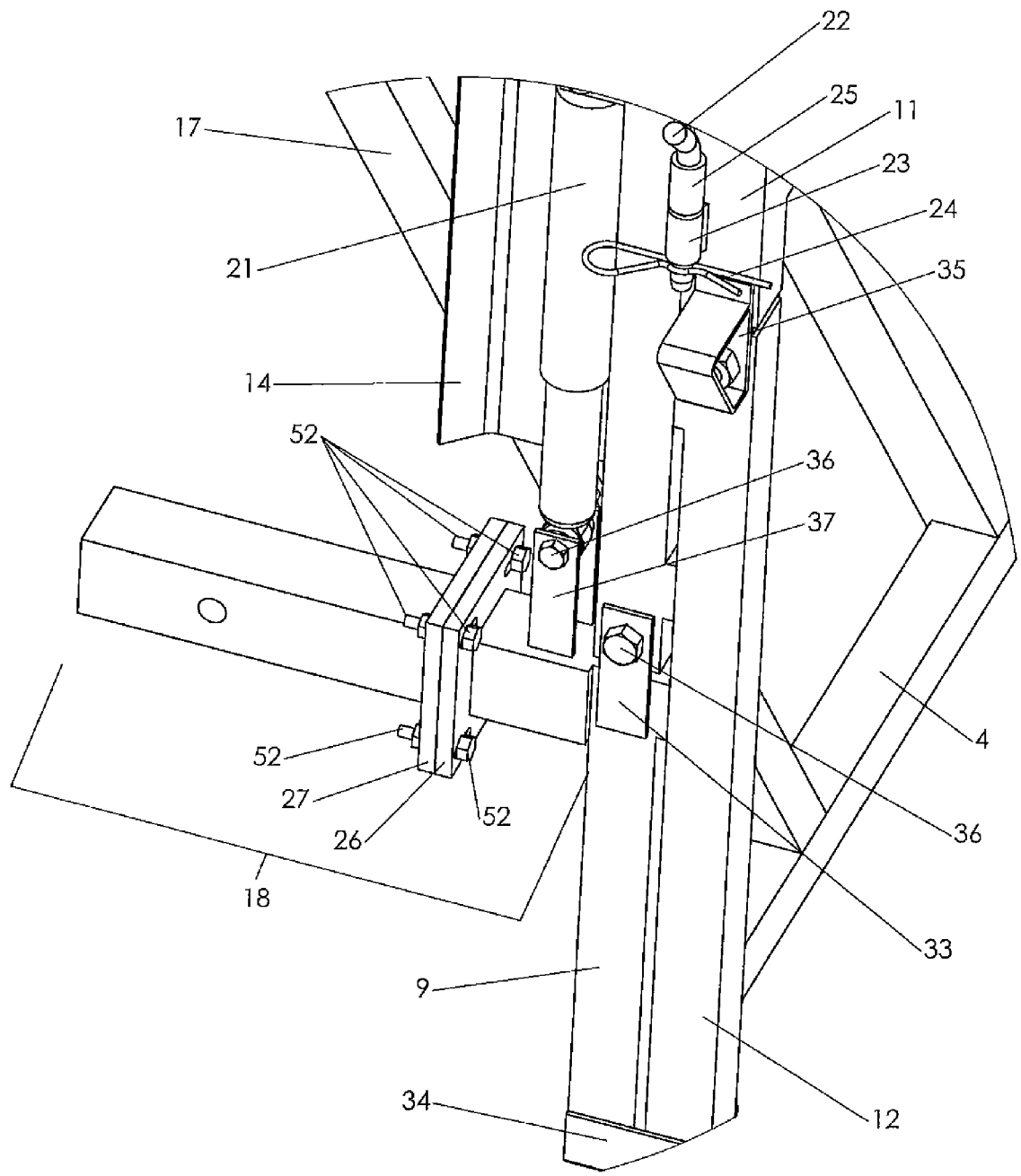
FIG. 18 is a detail view of the present invention in a folded up position showing the flanges on the mounting bar.
Figure 19:
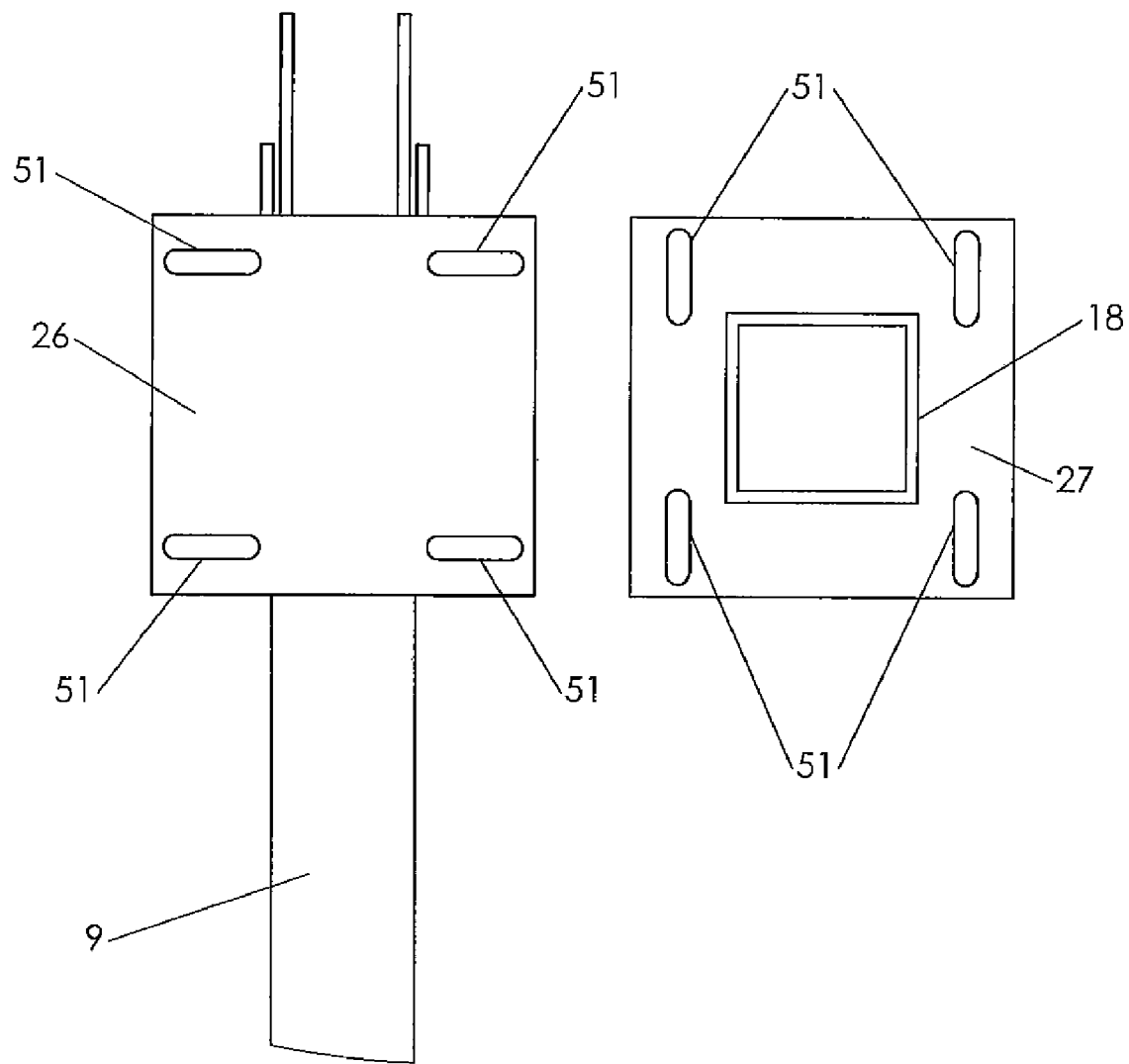
FIG. 19 is a plan view of the flanges on the mounting bar.

FIG. 18 is a detail view of the present invention in a folded up position showing the flanges 26, 27 on the mounting bar 18. FIG. 19 is a plan view of the flanges 26, 27 on the mounting bar 18. The purpose of these two figures is to illustrate the manner in which the flanges 26, 27 can be adjusted to allow for slight variations in mounting the device to the stacker. As shown in FIG. 19, both flanges comprise a plurality of slots 51. On one flange 26 the slots 51 are horizontal, and one the other flange 27 the slots 51 are vertical. By placing the flanges one on top of the other, the position of the flanges can be adjusted up or down and right or left, as needed. The flanges are secured to each other with bolts 52 that extend through the slots 51. The present invention is not limited to any particular configuration of slots on the flanges, and FIG. 19 is provided by way of illustration only.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A bale flipping device, comprising:
   (a) a first vertical bar;
   (b) a second vertical bar;
   (c) a third vertical bar;
   (d) a fourth vertical bar;
   (e) a first pivot arm;
   (f) a second pivot arm;
   (g) a third pivot arm;
   (h) a first support bar;
   (i) a second support bar;
   (k) a fourth support bar;
   (l) a first deflector shield;
   (m) a second deflector shield;
   (n) an attachment arm;
   (o) two guide arms; and
   (p) a mounting bar;

wherein the first pivot arm connects the first vertical bar to the third vertical bar;

wherein the second pivot arm connects the second vertical bar to the fourth vertical bar;

wherein the third pivot arm is parallel to the second pivot arm and also connects the second vertical bar to the fourth vertical bar;

wherein the first pivot arm is pivotally connected to the first vertical bar and the third vertical bar, wherein the second pivot arm is pivotally connected to the second vertical bar and the fourth vertical bar, and wherein the third pivot arm is pivotally connected to the second vertical bar and the fourth vertical bar;

wherein the first and second support bars are parallel to each other, wherein a third support bar is angled upward toward the second support bar at either end, and wherein the first and second support bars both connect on one end to the first vertical bar and on the other end to the second vertical bar;

wherein the first deflector shield extends upward from the first support bar;

wherein the second deflector shield extends upward from the second pivot arm;

wherein the attachment arm and two guide arms are attached on respective ends thereof to the fourth support bar, and wherein the fourth support bar is connected on one end to the point at which the fourth vertical bar joins the third pivot arm and at the other end to one end of the third vertical bar;

wherein the bale flipping device is mounted to a stacker attached to a trailor frame;

wherein the stacker comprises a first stacking table, and the guide arms slide underneath the first stacking table;

wherein the first support bar, second support bar, fourth support bar, first vertical bar, second vertical bar, third vertical bar, fourth vertical bar, first pivot arm, second pivot arm and third pivot arm define a rectangular-shaped chute when the device is fully extended;

wherein when the bale flipping device is in use, a rectangular-shaped hay bale travels from the first stacking table and slides down the guide arms into the rectangular-shaped frame of the bale flipping device;

wherein the bale flipping device is used to flip rectangular-shaped hay bales while the stacker is moving forward;

wherein as the rectangular-shaped hay bale enters the rectangular-shaped frame of the bale flipping device, a first end of the hay bale hits the first deflector shield and drops to the ground;

wherein after the first end of the hay bale hits the ground, the forward motion of the stacker causes a second end of the hay bale to hit the second deflector shield, thereby causing the hay bale to flip and a third end of the hay bale to hit the ground;

wherein the first and second ends of the hay bale are opposite one another;

wherein the third end of the hay bale is perpendicular to and lies between the first and second ends of the hay bale;

wherein the bale flipping device has a rear end, and the first pivot arm, first vertical bar and third vertical bar form a gap at the rear end of the bale flipping device;

wherein after the hay bale is flipped, the forward motion of the stacker causes the hay bale to exit through the rear end of the bale flipping device.

2. The bale flipping device of claim 1, wherein the second pivot arm is pivotally connected on one end to a first joinder plate and on the other end to a second joinder plate, and wherein the first joinder plate is connected to the second vertical bar and the second joinder plate is connected to the fourth vertical bar; wherein the third pivot arm is pivotally connected on one end to a third joinder plate and on the other end to a fourth joinder plate, and wherein the third joinder plate is connected to the fourth vertical bar and the fourth joinder plate is connected to the second vertical bar; wherein the first pivot arm is pivotally connected on one end to a fifth joinder plate and on the other end to a sixth joinder plate, and wherein the fifth joinder plate is connected to the first vertical bar and the sixth joinder plate is connected to the third vertical bar.

3. The bale flipping device of claim 1, further comprising a third support bar, wherein the third support bar is angled upward toward the second support bar at either end to avoid digging into an obstacle when the bale flipping device is in use and the stacker is moving forward.

4. The bale flipping device of claim 1, further comprising a metal sheet, wherein the metal sheet extends behind the first, second and third support bars.

5. The bale flipping device of claim 1, wherein the second support bar comprises a handle.

6. The bale flipping device of claim 1, further comprising a first mounting fixture and a second mounting fixture, wherein the first and second mounting fixtures are mounted onto a stacker, and wherein the mounting bar is inserted into the first mounting fixture and the attachment arm is inserted into the second mounting fixture.

7. The bale flipping device of claim 6, wherein the stacker comprises a trip lever, wherein the trip lever comprises a top portion, and wherein the trip lever is modified so that the top portion can be removed.

8. The bale flipping device of claim 1, wherein the mounting bar comprises two flanges, and wherein the position of the flanges relative to one another can be adjusted to account for variances in mounting the device to a stacker.

9. The bale flipping device of claim 1, further comprising two gas shocks, wherein the gas shocks are parallel to and directly above the first and second pivot arms when the device is in a fully extended position; and wherein the gas shocks control vertical movement of the bale flipping device when it is being folded up or down manually.

10. The bale flipping device of claim 9, wherein one of the gas shocks is pivotally connected to a bracket on either end of the gas shock, and wherein the bracket on one end of the gas shock is connected to the second pivot arm and the bracket on the other end of the gas shock is connected to the mounting bar.

11. The bale flipping device of claim 9, wherein the third vertical bar comprises an extension, wherein one of the gas shocks is pivotally connected to a bracket on either end of the gas shock, and wherein the bracket on one end of the gas shock is connected to the first pivot arm and the bracket on the other end of the gas shock is connected to the extension of the third vertical bar.

12. The bale flipping device of claim 1, further comprising a deflector guard that extends forward from the point at which the second vertical bar joins the third pivot arm, wherein the deflector guard deflects objects or debris that come into contact with the deflector guard when the bale flipping device is in use and the stacker is moving forward.

13. The bale flipping device of claim 1, wherein the second vertical bar comprises a first ring and the second pivot arm comprises a second ring, and wherein wherein when the device is in a folded up position, the first and second rings line up so that a pin can be inserted through both rings.

14. The bale flipping device of claim 1, wherein the fourth vertical bar comprises a first stop, wherein the second pivot arm comprises a second stop, wherein the third pivot arm comprises a third stop, and wherein the second vertical bar comprises a fourth stop, and wherein the purpose of the stops is to prevent the device from extending beyond the point at which the second pivot arm is roughly perpendicular to the fourth vertical bar and the second vertical bar.

15. The bale flipping device of claim 1, wherein the third vertical bar comprises a fifth stop, wherein the first pivot arm comprises a sixth stop, and wherein the purpose of the stops is to prevent the device from extending beyond the point at which the first pivot arm is roughly perpendicular to the first vertical bar and the third vertical bar.

* * * * *